(12) United States Patent
Yokoyama et al.

(10) Patent No.: US 10,298,078 B2
(45) Date of Patent: May 21, 2019

(54) MOTOR

(71) Applicant: DENSO CORPORATION, Aichi-pref. (JP)

(72) Inventors: Seiya Yokoyama, Toyohashi (JP); Yoji Yamada, Hamamatsu (JP); Koji Mikami, Kosai (JP); Akihisa Hattori, Toyohashi (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 15/744,692

(22) PCT Filed: Jul. 19, 2016

(86) PCT No.: PCT/JP2016/071105
§ 371 (c)(1),
(2) Date: Jan. 12, 2018

(87) PCT Pub. No.: WO2017/014212
PCT Pub. Date: Jan. 26, 2017

(65) Prior Publication Data
US 2019/0006898 A1   Jan. 3, 2019

(30) Foreign Application Priority Data

Jul. 21, 2015   (JP) .................................. 2015-144309
Dec. 24, 2015   (JP) .................................. 2015-251813
Jun. 17, 2016   (JP) .................................. 2016-120941

(51) Int. Cl.
*H02K 1/27* (2006.01)
*H02K 21/16* (2006.01)

(52) U.S. Cl.
CPC ............. *H02K 1/2766* (2013.01); *H02K 1/27* (2013.01); *H02K 1/278* (2013.01); *H02K 21/16* (2013.01)

(58) Field of Classification Search
CPC .......... H02K 21/16; H02K 1/27; H02K 1/278; H02K 1/2766
(Continued)

(56) References Cited

U.S. PATENT DOCUMENTS 6,034,460 A   3/2000   Tajima et al.
6,271,616 B1   8/2001   Akemakou
(Continued)

FOREIGN PATENT DOCUMENTS

JP   09285088 A   10/1997
JP   2001346368 A   12/2001
(Continued)

OTHER PUBLICATIONS

International Search Report corresponding to PCT/JP2016/071105, dated Oct. 5, 2016, four pages.
(Continued)

*Primary Examiner* — Naishadh N Desai
(74) *Attorney, Agent, or Firm* — Kilpatrick Townsend & Stockton LLP

(57) ABSTRACT

A motor includes a stator having windings and a rotor. The rotor includes a rotor core and a first magnet magnetic pole, a second magnet magnetic pole, and a protrusion provided next to each other in the circumferential direction. The second magnet magnetic pole has an opposite polarity to the first magnet magnetic pole. The protrusion projects in the radial direction in the rotor core. The windings include a first winding and a second winding. The first winding and the second winding are excited at the same timing, and are serially connected. The protrusion faces the second winding at the rotor rotation position at which the first magnet magnetic pole or the second magnet magnetic pole faces the first winding.

7 Claims, 18 Drawing Sheets

(58) Field of Classification Search
USPC .................................................. 310/179–210
See application file for complete search history.

(56) References Cited

U.S. PATENT DOCUMENTS

| | | | |
|---|---|---|---|
| 6,396,183 B1 | 5/2002 | Tajima et al. | |
| 2001/0028201 A1 | 10/2001 | Miyashita et al. | |
| 2002/0074887 A1 | 6/2002 | Takano et al. | |
| 2002/0130575 A1 | 9/2002 | Tajima et al. | |
| 2002/0130576 A1 | 9/2002 | Tajima et al. | |
| 2004/0174084 A1 | 9/2004 | Tajima et al. | |
| 2006/0017344 A1 | 1/2006 | Tajima et al. | |
| 2006/0017346 A1 | 1/2006 | Tajima et al. | |
| 2006/0017419 A1 | 1/2006 | Tajima et al. | |
| 2008/0284270 A1 | 11/2008 | Tajima et al. | |
| 2009/0309449 A1 | 12/2009 | Tajima et al. | |
| 2011/0181230 A1* | 7/2011 | Yamada | H02K 1/2746 318/724 |
| 2012/0001509 A1 | 1/2012 | Yamada et al. | |
| 2013/0313938 A1* | 11/2013 | Yamada | H02K 1/2713 310/156.69 |
| 2014/0062249 A1 | 3/2014 | Nagao et al. | |
| 2014/0265703 A1 | 9/2014 | Yamada et al. | |

FOREIGN PATENT DOCUMENTS

| | | |
|---|---|---|
| JP | 2002209349 A | 7/2002 |
| JP | 2002252941 A | 9/2002 |
| JP | 2002534047 A | 10/2002 |
| JP | 2010094001 A | 4/2010 |
| JP | 2011083066 A | 4/2011 |
| JP | 2012034520 A | 2/2012 |
| JP | 2014135852 A | 7/2014 |
| JP | 2015095999 A | 5/2015 |

OTHER PUBLICATIONS

Translation of International Preliminary Report on Patentability corresponding to PCT/JP2016/071105, dated Jan. 23, 2018, five pages.

* cited by examiner

MOTOR

TECHNICAL FIELD

The present invention relates to a motor.

BACKGROUND ART

In the prior art, as described in, for example, patent document 1, a permanent magnet motor such as a brushless motor includes a stator, which is formed by windings wound around a stator core, and a rotor, which uses permanent magnets opposing the stator, as magnet poles. The windings of the stator are supplied with drive current to generate a rotational magnetic field that rotates the rotor.

PATENT DOCUMENT

Patent Document 1: Japanese Laid-Open Patent Publication No. 2014-135852

SUMMARY OF THE INVENTION

Problems That Are To Be Solved by the Invention

In a permanent magnet motor such as that described above, when the rotor is driven to rotate at a higher speed, an increase in flux linkage resulting from the permanent magnets of the rotor increases the induced voltage generated at the windings of the stator. The induced voltage lowers the motor output and hinders rotation of the rotor at a higher speed.

It is an object of the present invention to provide a motor that allows for rotation at a higher speed.

Means for Solving the Problem

To achieve the above object, a motor according to one aspect of the present invention includes a stator including windings and a rotor rotated by a rotational magnetic field generated when drive currents are supplied to the windings. The rotor includes a rotor core, a first magnet pole, a second magnet pole, and a projection. The first magnet pole, the second magnet pole, and the projection are arranged next to one another in a circumferential direction. The first magnet pole uses a permanent magnet arranged in the rotor core. The second magnet pole uses a permanent magnet arranged in the rotor core. The second magnet pole has a different polarity from that of the first magnet pole. The projection projects from the rotor core in a radial direction. The windings include a first winding and a second winding. The first winding and the second winding are synchronously excited by the drive currents and connected in series. The motor is configured so that the projection is opposed to the second winding at a rotational position of the rotor where the first magnet pole or the second magnet pole is opposed to the first winding.

EMBODIMENTS OF THE INVENTION

One embodiment of a motor will now be described.

Figure 1:
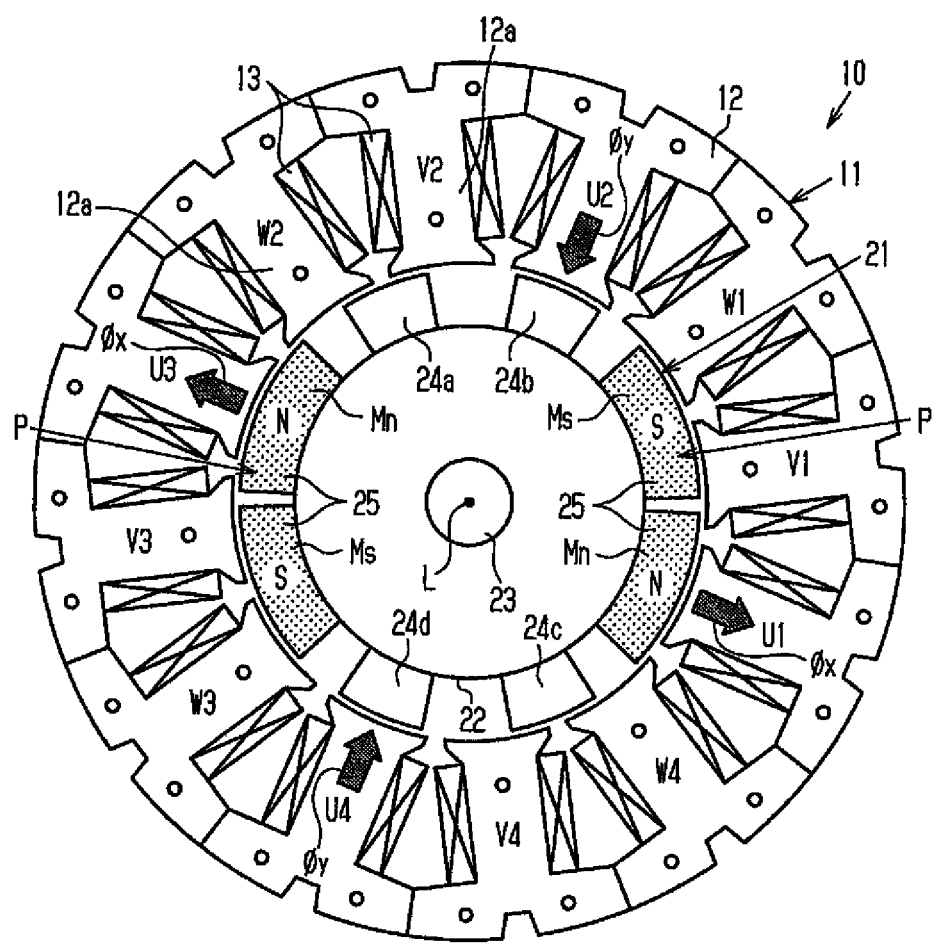
FIG. 1 is a plan view of a motor according to one embodiment of the present invention.

As shown in FIG. 1, a motor 10 of the present embodiment is configured as a brushless motor and includes an annular stator 11 and a rotor 21 arranged at an inner side of the stator 11.

Structure of Stator

The stator 11 includes a stator core 12 and windings 13 wound around the stator core 12. The stator core 12 is substantially ring-shaped and formed from a magnetic metal.

The stator core 12 includes twelve teeth 12a extending inward in the radial direction at equal angular intervals in the circumferential direction.

There are twelve windings 13, the number of which is the same as the teeth 12a. The windings 13 are wound as concentrated windings in the same direction around the teeth 12a, respectively. That is, the twelve windings 13 are arranged in the circumferential direction at equal angular intervals (thirty-degree intervals). The windings 13 are classified into three phases in accordance with the three phases of supplied drive current (U-phase, V-phase, and W-phase) and indicated in order in the counterclockwise direction as U1, V1, W1, U2, V2, W2, U3, V3, W3, U4, V4, and W4 in FIG. 1.

With regard to each phase, the U-phase windings U1 to U4 are arranged in the circumferential direction at equal angular intervals (ninety-degree intervals). In the same manner, the V-phase windings V1 to V4 are arranged in the circumferential direction at equal angular intervals (ninety-degree intervals). The W-phase windings W1 to W4 are also arranged in the circumferential direction at equal angular intervals (ninety-degree intervals).

Figure 2:
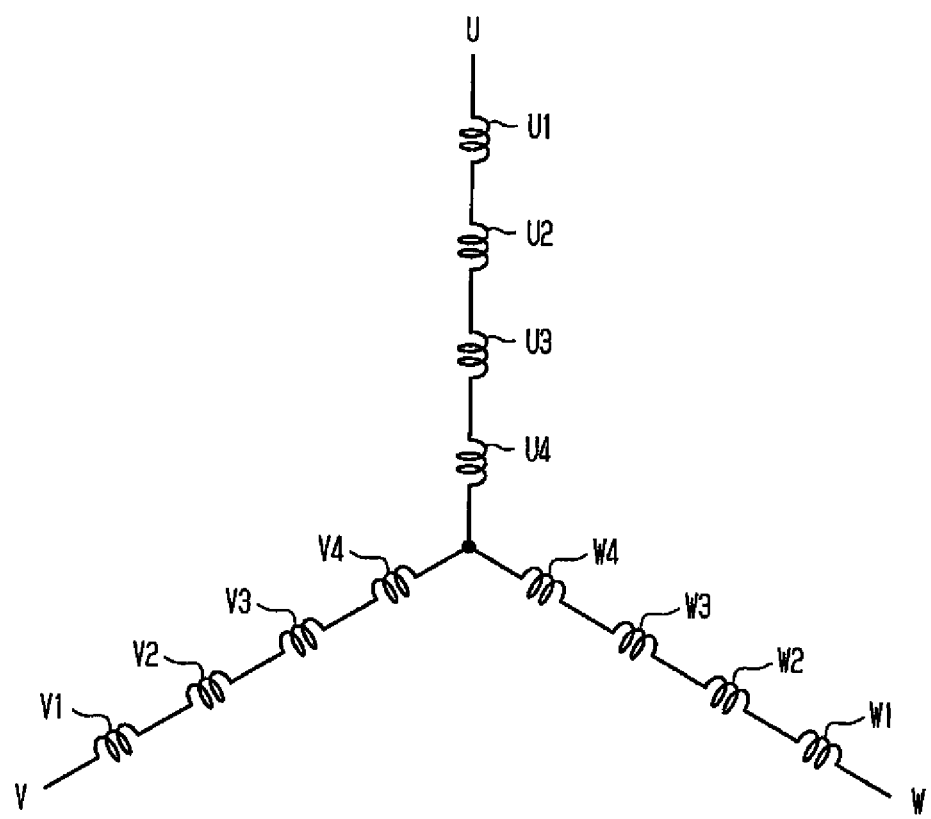
FIG. 2 is an electric circuit diagram showing the connection of windings shown in FIG. 1.

As shown in FIG. 2, the windings 13 in each phase are connected in series. That is, the U-phase windings U1 to U4, the V-phase windings V1 to V4, and the W-phase windings W1 to W4 respectively form series circuits. In the present embodiment, the series circuit of the U-phase windings U1 to U4, the series circuit of the V-phase windings V1 to V4, and the series circuit of the W-phase windings W1 to W4 are in a star connection.

Structure of Rotor

As shown in FIG. 1, a rotor core 22 of the rotor 21 is substantially disk-shaped and formed from a magnetic metal. A rotation shaft 23 is fixed to the central portion of the rotor core 22. An outer circumferential portion of the rotor core 22 includes two magnet pole pairs P and four projections 24a, 24b, 24c, 24d that are alternately arranged in the circumferential direction. Each magnet pole pair P includes an N-magnet pole Mn and an S-magnet pole Ms that are adjacent to each other in the circumferential direction. The projections 24a, 24b, 24c, 24d are formed integrally with the rotor core 22 and project outward in the radial direction. That is, the magnet poles Mn and Ms and the projections 24a, 24b, 24c, 24d, which are arranged on the rotor 21, are the same in number. The magnet poles Mn and Ms function as a first magnet pole and a second magnet pole, respectively.

The two magnet pole pairs P are arranged in the circumferential direction at 180-degree opposing positions. The two projections 24a, 24b, which are adjacent to each other in the circumferential direction, and the two projections 24c, 24d, which are adjacent to each other in the circumferential direction, are arranged between the two magnet pole pairs P in the circumferential direction. More specifically, an S-magnet pole Ms, an N-magnet pole Mn, the projection 24a, the projection 24b, another S-magnet pole Ms, another N-magnet pole Mn, the projection 24c, and the projection 24d are arranged on the outer circumferential portion of the rotor 21 in order in the clockwise direction.

Each of the N-magnet poles Mn and the S-magnet poles Ms includes a permanent magnet 25 fixed to the outer circumferential surface of the rotor core 22. Thus, the rotor 21 has a surface magnetic construction (SPM structure) in which four permanent magnets 25 are fixed to the outer circumferential surface of the rotor core 22.

The permanent magnets 25 are identical in shape. The two permanent magnets 25 in each magnet pole pair P are arranged adjacent to each other in the circumferential direction. The outer circumferential surface (radially outer surface) of each permanent magnet 25, defining the surface opposed to the stator 11, is arcuate and extends about an axis L of the rotation shaft 23 as viewed in the direction of the axis L. Also, the outer circumferential surface (radially outer surface) of each of the projections 24a to 24d, defining the surface opposed to the stator 11, is arcuate and concyclic with the outer circumferential surfaces of the permanent magnets 25 as viewed in the direction of the axis L.

Each permanent magnet 25 is formed so that the magnetic orientation is directed in the radial direction. In further detail, each permanent magnet 25 having the N-magnet pole Mn is magnetized so that the magnet pole formed at the outer circumference side is the N-pole, and each permanent magnet 25 having the S-magnet pole Ms is magnetized so that the magnet pole formed at the outer circumference side is the S-pole. The permanent magnets 25 are, for example, anisotropic sintered magnets and configured by, for example, neodymium magnets, samarium-cobalt (SmCo) magnets, SmFeN magnets, ferrite magnets, alnico magnets, or the like. The permanent magnets 25 are arranged so that those of the same polarity are arranged in the circumferential direction at 180-degree opposing positions. That is, the N-magnet poles Mn are arranged at 180-degree opposing positions, and the S-magnet poles Ms are arranged at 180-degree opposing positions.

The operation of the present embodiment will now be described.

A drive circuit (not shown) supplies drive currents (AC) of three phases having phase differences of 120° to the U-phase windings U1 to U4, the V-phase windings V1 to V4, and the W-phase windings W1 to W4, respectively. Thus, in the windings U1 to W4, those of the same phase are synchronously excited. This generates a rotational magnetic field in the stator 11. The rotational magnetic field rotates the rotor 21. In this case, the operation of the rotational magnetic field of the stator 11 and the magnet poles Mn and Ms generates magnet torque in the rotor 21. Also, the operation of the rotational magnetic field of the stator 11 and the projections 24a to 24d of the rotor core 22 generates reluctance torque in the rotor 21.

Additionally, in this case, the supply of the three-phase drive currents forms poles in the stator 11 so that those having the same phases in the windings U1 to W4 have the same polarity. In the present embodiment, the number of the magnetic poles of the rotor 21 (number of magnet poles Mn and Ms) is four. However, in the windings U1 to W4, those of each phase is supplied with drive current set assuming that the number of poles of the rotor 21 is two times the number of the magnet poles Mn and Ms (eight poles in the present embodiment).

During high-speed rotation of the rotor 21, field weakening control is executed to supply the windings 13 with field weakening current (d-axis current). During high-speed rotation of the rotor 21 (during field weakening control), for example, as shown in FIG. 1, when the N-magnet poles Mn radially oppose the U-phase windings U1 and U3, the projections 24b and 24d radially oppose the U-phase windings U2 and U4.

In this case, the U-phase windings U1 to U4 are each supplied with a field weakening current. However, in the U-phase windings U1 and U3, the opposing N-magnet poles Mn generate flux (flux toward radially outer side in radial direction) that exceeds the flux linkage resulting from the field weakening current (flux linkage toward radially inner side). This generates flux linkage $\phi x$ that passes through the U-phase windings U1 and U3 toward the outer side in the radial direction.

In the U-phase windings U2 and U4, the opposing portions of the rotor 21 are the projections 24b and 24d of the rotor core 22 and not the magnet poles Mn. Thus, flux linkage $\phi y$ resulting from the field current is not eliminated, and the flux linkage $\phi y$ passes through the U-phase windings U2 and U4 toward the inner side in the radial direction. In this manner, the projections 24b and 24d of the rotor core 22 opposed to the U-phase windings U2 and U4 allow for the generation of the flux linkage $\phi y$ resulting from the field weakening current. Thus, the phase of the flux linkage $\phi y$, which is generated at the U-phase windings U2 and U4, is inverted from the phase of the flux linkage $\phi x$, which is generated at the U-phase windings U1 and U4 by the magnet poles Mn.

The flux linkages φx and φy generate induced voltages at the U-phase windings U1 to U4. In this case, the phases of the flux linkages φx and φy are opposite to each other. Thus, the induced voltage generated by the flux linkage φy at the U-phase windings U2 and U4 has an inverted polarity (inverted phase) with respect to the induced voltage generated by the flux linkage φx at the U-phase windings U1 and U3. This effectively reduces the combined induced voltage, which combines the induced voltages at the U-phase windings U1 to U4.

The above operation also occurs in the windings opposed to the S-magnet poles Ms. More specifically, when the S-magnet poles Ms are opposed to the U-phase windings U1 and U3, the projections 24a and 24c of the rotor core 22 are opposed to the U-phase windings U2 and U4. Thus, the induced voltage generated at the U-phase windings U1 and U3 has an inverted phase with respect to the induced voltage generated at the U-phase windings U2 and U4. This effectively reduces the combined induced voltage, which combines the induced voltages at the U-phase windings U1 to U4.

Here, an example using the combined induced voltage of the U-phase windings U1 to U4 has been described. In the same manner, the projections 24a to 24d of the rotor core 22 also reduce the combined induced voltage at the V-phase windings V1 to V4 and the W-phase windings W1 to W4.

Arrangement of Rotor Magnet Poles and Projections

Figure 3:
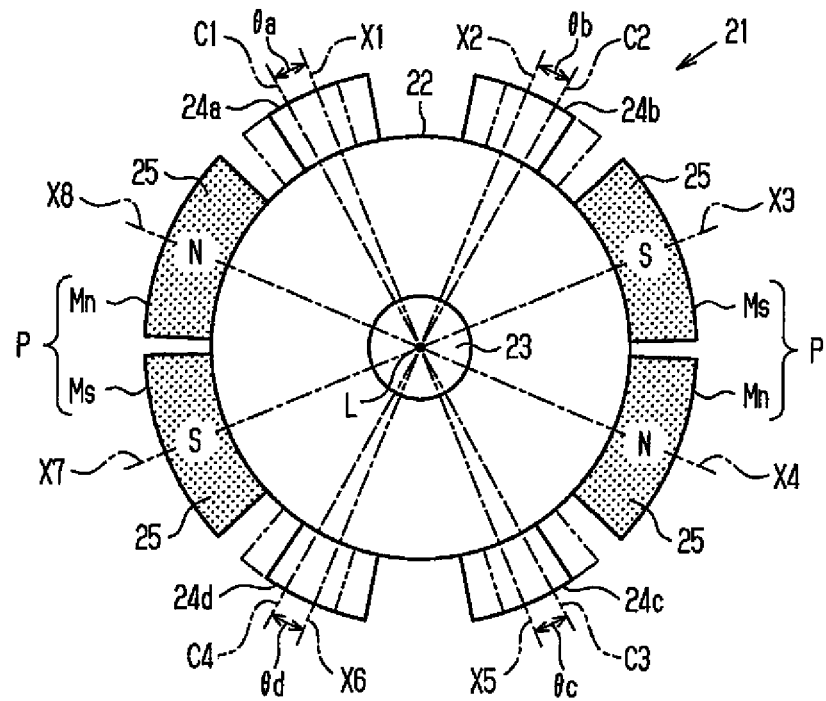
FIG. 3 is a plan view showing the arrangement pattern of magnet poles and projections of the rotor shown in FIG. 1.

As shown in FIG. 3, when n represents the total number of the magnet poles Mn and Ms, a 2n number of reference lines extends from the rotational axis of the rotor 21 (axis L of rotation shaft 23) in the radial direction. The reference lines are set at equal angular intervals in the circumferential direction. In the present embodiment, the total number of the magnet poles Mn and Ms is four. Thus, eight reference lines X1 to X8 are set at equal intervals of 45° in order in the clockwise direction.

The magnet poles Mn and Ms each have a circumferential center arranged to be aligned with one of the eight reference lines X1 to X8.

More specifically, the circumferential centers of the two N-magnet poles Mn are arranged to be aligned with the reference lines X4 and X8. That is, the two N-magnet poles Mn are arranged in the circumferential direction at 180-degree opposing positions.

Also, the circumferential centers of the two S-magnet poles Ms are arranged to be aligned with the reference lines X3 and X7. That is, the two S-magnet poles Ms are arranged in the circumferential direction at 180-degree opposing positions. In each magnet pole pair P, the magnet poles Mn and Ms, which are adjacent to each other, have an interval (open angle) between the circumferential centers set to 45°.

On the other hand, the projections 24a to 24d respectively have circumferential centers C1 to C4, which are misaligned with any one of the reference lines X1 to X8. Examples of arrangement patterns of the projections 24a to 24d will be described below.

In the description below, θa represents the misalignment angle of the circumferential center C1 with the reference line X1, θb represents the misalignment angle of the circumferential center C2 with the reference line X2, θc represents the misalignment angle of the circumferential center C3 with the reference line X5, and θd represents the misalignment angle of the circumferential center C4 with the reference line X6. A misalignment angle in the clockwise direction has a positive value.

First Arrangement Pattern
θa<0°, θb>0°
θc=θa
θd=θb

Second Arrangement Pattern
θa>0°, θb<0°
θc=θa
θd=θb

Third Arrangement Pattern
θa<0°, θb<0°
θc=θa
θd=θb

Fourth Arrangement Pattern
θa>0°, θb>0°
θc=θa
θd=θb

Each of the first to fourth arrangement patterns is configured so that θc=θa and θd=θb. Instead, the setting may be θc≠θa and θb≠θd. Also, in the first to fourth arrangement patterns, θa to θd≠0°, that is, each of the projections 24a to 24d is configured to be misaligned with the reference lines X1, X2, X5, and X6. However, as long as at least one of the projections 24a to 24d is misaligned with the reference lines, the circumferential centers of the remaining projections may be aligned with the reference lines.

It is desirable that the projections 24a and 24b (and projections 24c and 24d), which are adjacent to each other in the circumferential direction, be spaced apart from each other and that each of the projections 24a to 24d be spaced apart from the adjacent one of the magnet poles Mn and Ms.

Open Angle of Rotor Magnet poles and Projections

Each N-magnet pole Mn (N-pole permanent magnet 25) includes an outer circumferential surface 26 (radially outer surface) having an open angle θn. Each S-magnet pole Ms (S-pole permanent magnet 25) includes an outer circumferential surface 27 (radially outer surface) having an open angle θs. The projections 24a to 24d each include an outer circumferential surface 28 (radially outer surface) having open angles θ1 to θ4, respectively. The setting of the open angle θn, the open angle θs, and the open angles θ1 to θ4 will now be described with reference to FIG. 4. An open angle is the angle of a subject from one end to the other end of the subject in the circumferential direction. The outer circumferential surfaces 26 to 28 each function as an opposing surface.

The open angles θn and θs of the magnet poles Mn and Ms are set to be equal to each other. The open angles θ1 to θ4 of the projections 24a to 24d are set to be smaller than the open angles θn and θs. Examples of setting patterns of the open angles θ1 to θ4 of the projections 24a to 24d will be described below.

First Open Angle Setting Pattern
θn=θs=α
θ1=θ2=θ3=θ4=β
β<α

Second Open Angle Setting Pattern
θn=θs=α
θ1=θ3=β
θ2=θ4=γ
β≠γ
β, γ<α

Third Open Angle Setting Pattern
θ1=θ2=θ3=θ4=α
α<θs<θn

In each of the first to third setting patterns, the setting is configured so that θ1=θ3 and θ2=θ4. Instead, the setting may be θ1≠θ3 and θ2≠θ4.

Figure 4:
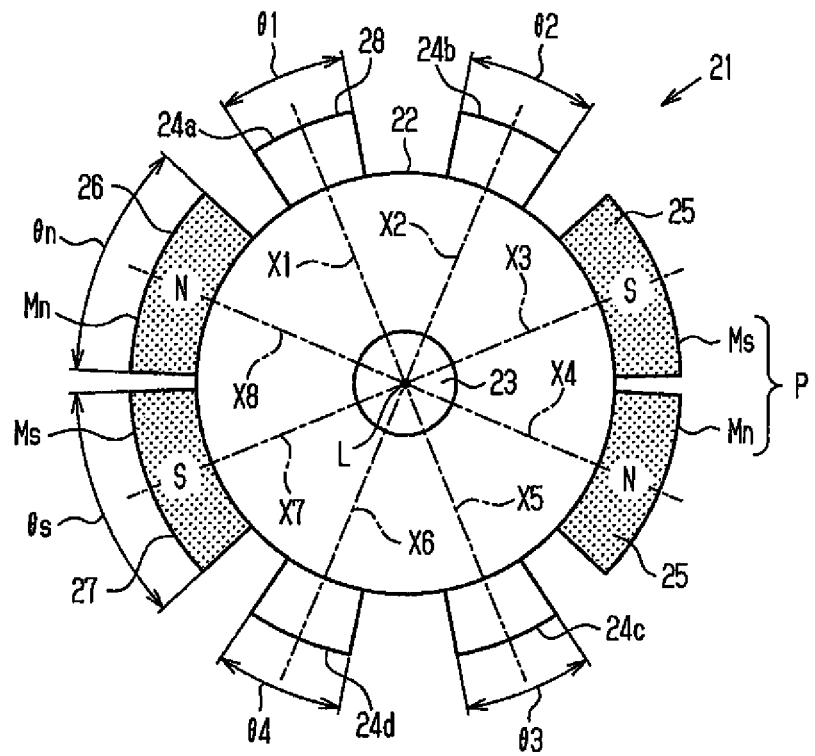
FIG. 4 is a plan view showing the setting pattern of open angles of the magnet poles and the projections in the rotor shown in FIG. 1.

In the structure shown in FIG. 4, the circumferential centers of the projections 24a to 24d are arranged to be aligned with the reference lines X1, X2, X5, and X6, respectively. Instead, the structure may include the combination of one of the first to fourth arrangement patterns and one of the first to third open angle setting patterns.

The present embodiment has the advantages described below.

(1) In correspondence with the supplied drive currents of three phases, the windings 13 of the stator 11 include the four U-phase windings U1 to U4, the four V-phase windings V1 to V4, and the four W-phase windings W1 to W4. The four windings of each phase are connected in series. That is, the windings 13 of the stator 11 include at least two series-connected windings (first winding and second winding) for each phase. For example, the projections 24b and 24d (or projections 24a and 24c) are configured to be opposed to the U-phase windings U2 and U4, respectively, at a rotational position where the magnet poles Mn (or magnet poles Ms) are opposed to the U-phase windings U1 and U3.

With this structure, the projections 24a to 24d, which are part of the rotor core 23, function without limiting the generation of the flux linkage resulting from the field weakening current (d-axis current) at the second winding. The flux linkages φy resulting from the field weakening current generate induced voltages at the windings 13 opposed to the projections 24a to 24d. The induced voltages have an inverted polarity (inverted phase) with respect to induced voltages generated at the windings 13 of the magnet poles Mn (or magnet poles Ms). This reduces the combined induced voltage at each phase. As a result, the motor 10 can be rotated at a higher speed.

When a winding construction connects the windings 13 of each phase in series like in the present embodiment, the sum of the induced voltage generated at each winding for each phase is the combined induced voltage. Accordingly, there is a tendency for the combined induced voltage to increase. Thus, in a construction in which the windings 13 of each phase are connected in series, the arrangement of the projections 24a to 24d on the rotor 21 increases the effect for reducing the combined induced voltage and allows the motor 10 to be rotated at a higher speed in a further optimal manner.

When the magnet poles Mn and Ms, which have flux compelling force, and the projections 24a to 24d of the rotor core 21, which do not have flux compelling force, are arranged next to one another in the circumferential direction, the concentration of the flux suddenly changes at boundaries of the magnet poles Mn (or magnet poles Ms) and the projections 24a to 24d. This may cause the cogging torque to increase. However, the cogging torque may be limited by changing the shapes of the projections 24a to 24d of the rotor core 21 to shift the phase of the cogging torque.

Further, the rotor 21 includes the projections 24a to 24d. This reduces the field weakening current supplied to the windings 13. The reduced field weakening current limits demagnetization of the permanent magnet 25 during field weakening control and limits copper loss of the windings 13. In other words, the flux linkage amount that can be reduced by the same amount of field weakening current increases. This allows the field weakening control to further effectively increase the rotation speed.

(2) The circumferential centers of the magnet poles Mn and Ms are arranged to be aligned with the reference lines X3, X4, X7, and X8. The circumferential center of at least one of the projections 24a to 24d is arranged to be misaligned with the reference lines X1, X2, X5, and X6.

This structure allows for shifting of the phase of cogging torque generated during rotation of the rotor 21. This limits maximization of the cogging torque at a particular frequency. Consequently, the vibration generated by cogging torque is limited.

(3) In at least one of the projections 24a to 24d, the open angle of the outer circumferential surface 28 is set to differ from the open angles θn and θs of the outer circumferential surfaces 26 and 27 of the magnet poles Mn and Ms (permanent magnets 25).

This structure also allows for shifting of the phase of cogging torque generated during rotation of the rotor 21. This limits maximization of the cogging torque at a particular frequency. Accordingly, the vibration generated by cogging toque is limited.

The above embodiment may be modified as follows.

Figure 5:
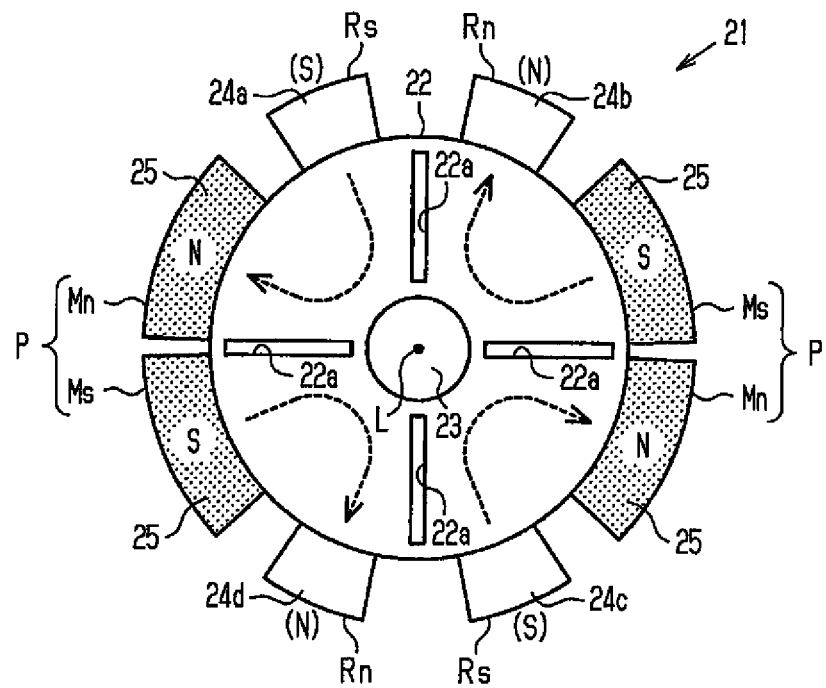
FIG. 5 is a plan view of a rotor in a further example.

In the rotor 21 of the embodiment, as shown in FIG. 5, the rotor core 22 may include slits 22a extending in the radial direction of the rotation shaft 23. In the example shown in the drawing, the slits 22a are arranged in the circumferential direction at 90-degree intervals in boundaries between circumferentially adjacent ones of the projections 24a and 24b and the projections 24c and 24d and boundaries between the magnet poles Mn and Ms that are located adjacent to each other in the circumferential direction. The slits 22a extend through the rotor core 22 in the axial direction. The inside of each slit 22a is a gap, which has a greater magnetic resistance than the rotor core 22 formed by a magnetic metal. Thus, the slits 22a preferably guide the flux of each permanent magnet 25 passing through the rotor core 22 to the circumferentially adjacent one of the projections 24a to 24d (see arrows in broken lines in drawing).

Consequently, each of the projections 24a to 24d functions as a pseudo-magnet pole (core magnet pole) due to the operation of the flux of the adjacent one of the magnet poles Mn and Ms (permanent magnets 25) in the circumferential direction. More specifically, each of the projections 24a and 24c, which is located adjacent to the N-magnet pole Mn in the circumferential direction, serves as an S-magnetic core pole Rs. Each of the projections 24b and 24d, which is located adjacent to the S-magnet pole Ms in the circumferential direction, serves as an N-magnetic core pole Rn.

In the above embodiment, the rotor core 22 does not include the slits 22a that are configured as shown in FIG. 5. Thus, the flux (magnetic flux) of the magnet poles Mn and Ms short-circuits between the different polarities and thus subtly flows to the projections 24a to 24d. Consequently, the magnetic flux does not form magnet poles in the projections 24a to 24d. As a result, each of the projections 24a to 24d serves as a flux toleration portion that tolerates the generation of a field weakening flux (flux linkage φy resulting from field weakening current) at the windings 13. This structure hinders obtainment of magnet torque and is disadvantageous for obtaining higher torque. However, this structure is advantageous for rotating at a higher speed.

In the structure shown in FIG. 5, the slits 22a, which are formed in the rotor core 22, allow the projections 24a to 24d to function as the magnetic core poles Rn and Rs. The flux of the magnetic core poles Rn and Rs (projections 24a to 24d) limits the generation of a field weakening flux (flux linkage resulting from field weakening current) at the windings 13. Therefore, this structure is disadvantageous for rotating at a higher speed but advantageous for obtaining higher torque as compared to a structure in which the projections 24a to 24d serve as the flux toleration portions like in the above embodiment.

The output properties (torque and rotation speed) of the motor may be adjusted in accordance with the function of the projections 24a to 24d as the flux toleration portions like in the above embodiment or as the magnetic core poles Rn and Rs. When the projections 24a to 24d function as the magnetic core poles Rn and Rs, the output properties (torque and rotation speed) of the motor may also be adjusted by adjusting the amount of magnetic flux guided to the magnetic core poles Rn and Rs (projections 24a to 24d) (e.g., changing structure such as shape of slits 22a).

In the rotor 21 of the above embodiment, the magnet poles Mn and Ms (permanent magnets 25) are arranged so that those of the same polarity are arranged at 180-degree opposing positions. However, there is no limit to such an arrangement.

For example, the magnet poles Mn and Ms (permanent magnets 25) may be arranged over one-half of the circumference of the rotor core 22 so that the N-poles and S-poles are located alternately. The projections 24a to 24d may be arranged over the remaining one-half of the circumference. Such a configuration obtains advantage (3) of the above embodiment.

The rotor 21 of the above embodiment has an SPM structure in which the permanent magnets 25, which form the magnet poles Mn and Ms, are fixed to the outer circumferential surface of the rotor core 22. Instead, an interior magnet structure (IPM structure) may be employed in which permanent magnets are embedded in the rotor core 22 at each of the magnet poles Mn and Ms. This structure is advantageous in that demagnetization of the permanent magnets is reduced during field weakening control.

In the above embodiment, the windings of each phase, namely, the U-phase windings U1 to U4, the V-phase windings V1 to V4, and the W-phase windings W1 to W4 are connected in series, respectively. However, there is no limit to such a construction. The winding construction may be changed.

Figure 6:
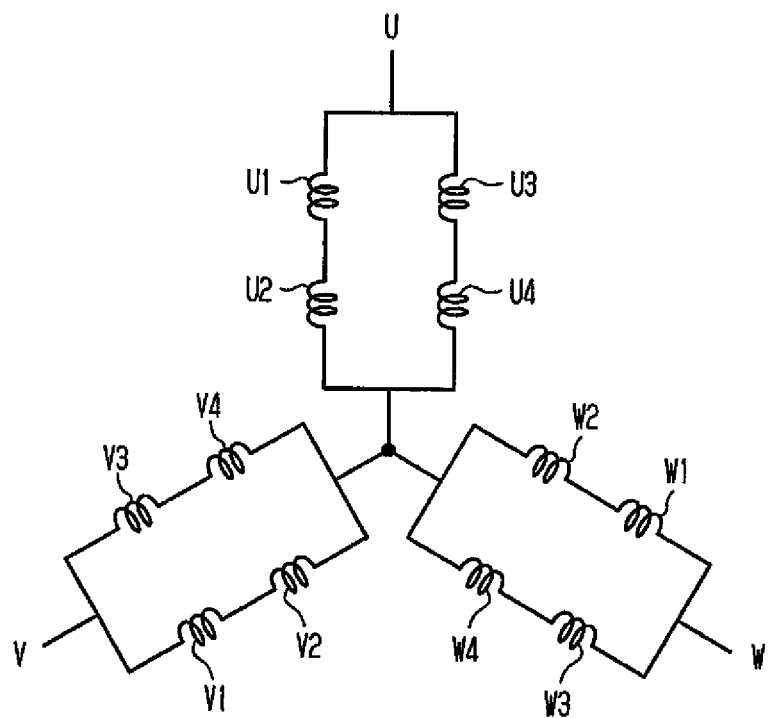
FIG. 6 is an electric circuit diagram showing the connection of windings in a further example.

For example, in the example shown in FIG. 6, with regard to the U-phase, the windings U1 and U2 are connected in series, and the windings U3 and U4 are connected in series. The series-connected pair of the windings U1 and U2 is connected in parallel to the series-connected pair of the windings U3 and U4. In the same manner, with regard to the V-phase, the windings V1 and V2 are connected in series, and the windings V3 and V4 are connected in series. The series-connected pair of the windings V1 and V2 is connected in parallel to the series-connected pair of the windings V3 and V4. Also in the same manner, with regard to the W-phase, the windings W1 and W2 are connected in series, and the windings W3 and W4 are connected in series. The series-connected pair of the windings W1 and W2 is connected in parallel to the series-connected pair of the windings W3 and W4.

When applying the winding arrangement of FIG. 6 to the structure of the rotor 21 in the above embodiment (refer to FIG. 1), for example, induced voltages of the same level are generated at the winding U1 and the winding U3. Further, induced voltages of the same level are generated at the winding U2 and the winding U4. Thus, the combined induced voltage generated at the series-connected pair of the windings U1 and U2 is substantially equal to the combined induced voltage generated at the series-connected pair of the windings U3 and U4. Accordingly, the reduction in the induced voltage resulting from the projections 24a to 24d constantly occurs at both the series-connected pair of the windings U1 and U2 and the series-connected pair of the windings U3 and U4. Further, the series-connected pair of the windings U1 and U2 is connected in parallel to the series-connected pair of the windings U3 and U4. Thus, the combined induced voltage of all of the U-phase windings is substantially equal to the combined induced voltage of the windings U1 and U2 (and combined induced voltage of series-connected pair of windings U3 and U4). This effectively reduces the combined induced voltage.

A case will now be considered in which the winding U2 and the winding U3 are exchanged with each other in the example of FIG. 6, that is, the windings U1 and U3 having the same induced voltage are connected in series, and the windings U2 and U4 having the same induced voltage are connected in series. In this case, the reduction in the induced voltage resulting from the projections 24a to 24d occurs at only one of the series-connected pair of the windings U2 and U4 the series-connected pair of the windings U1 and U3. The reduction in the induced voltage does not occur at the other one of the series-connected pairs. Further, the series-connected pair of the windings U1 and U3 is connected in parallel to the series-connected pair of the windings U2 and U4. This is disadvantageous for effectively reducing the combined effective voltage in all of the U-phase windings. In the same manner, when the U-phase windings U1 to U4 are connected in parallel, this is disadvantageous for effectively reducing the combined effective voltage in all of U-phase windings.

As described above, the windings (e.g., U-phase winding U1 and U-phase winding U2) opposing the magnet poles Mn (magnet poles Ms) and the projections at a predetermined rotational position of the rotor 21 are connected in series. Thus, the combined induced voltage is obtained by adding the induced voltages having inverted polarities (inverted phases) generated at the windings of the same phase that are connected in series. This effectively reduces the combined induced voltage of each phase.

In the example of FIG. 6, with regard to the U-phase, the windings U1 and U2 are connected in series as a pair, and the windings U3 and U4 are connected in series as a pair. However, when connecting the windings U1 and U4 in series as a pair and connecting the windings U2 and U3 in series as a pair, the same advantages can be obtained. Further, similar changes may be made to the V-phase and the W-phase.

Further, in the example of FIG. 6, with regard to the U-phase, the series-connected pair of the windings U1 and U2 is connected in parallel to the series-connected pair of the windings U3 and U4. Instead, the series-connected pair of the windings U1 and U2 can be separated from the series-connected pair of the windings U3 and U4, and a pair of inverters may be arranged to supply U-phase drive current to each of the separated series-connected pairs. This configuration obtains the same advantages. Similar changes can be made to the V-phase and the W-phase.

In the above embodiment (refer to FIG. 2) and the example of FIG. 6, the windings form a star connection. Instead, the windings may form, for example, a delta connection.

In the above embodiment, the total number of the magnet poles Mn and Ms in the rotor 21 is four, and the number (slot number) of the windings 13 of the stator 11 is twelve. However, the total number of the magnet poles Mn and Ms and the number of the windings 13 may be changed in accordance with the structure. For example, the total number of the magnet poles Mn and Ms and the number of the windings 13 may be changed so that the total number of the magnet poles Mn and Ms and the number of the windings 13 have a relationship of n:3 (where n is an integer of 2 or larger). When the total number of the magnet poles Mn and Ms is an even number like in the above embodiment, the number of magnet poles Mn can be the same as the number of magnet poles Ms. This allows for a structure that is well-balanced in magnetic terms.

Further, the total number of the magnet poles Mn and Ms and the number of the windings 13 does not necessarily have to be in a relationship of n:3n (where n is an integer of 2 or greater). For example, the total number of the magnet poles Mn and Ms and the number of the windings 13 may have a relationship of 5:12, 7:12, or the like.

Figure 7:
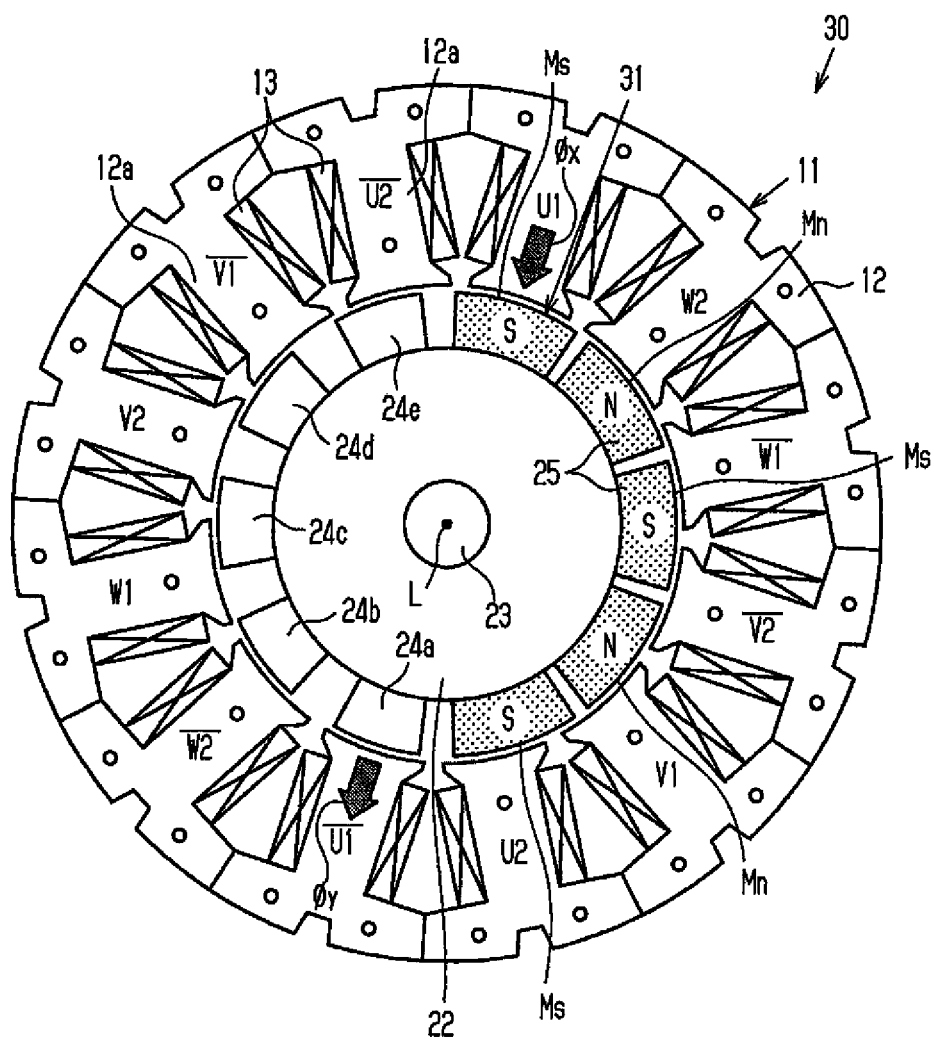
FIG. 7 is a plan view of a motor in a further example.

FIG. 7 shows one example of a motor 30 in which the total number of the magnet poles Mn and Ms and the number of the windings 13 have a relationship of 5:1. In the example of FIG. 7, same reference numerals are given to those components that are the same as the corresponding components of the above embodiment. Such components will not be described in detail. The description hereafter will focus on differences from the above embodiment.

In the motor 30 shown in the drawing, the twelve windings 13 of the stator 11 are classified in accordance with the supplied drive currents of three phases (U-phase, V-phase, and W-phase) and indicated in FIG. 7 in order in the counterclockwise direction as U1, bar U2, bar V1, V2, W1, bar W2, bar U1, U2, V1, bar V2, bar W1, and W2. The U-phase windings U1 and U2, the V-phase windings V1 and V2, and the W-phase windings W1 and W2 are formed by forward windings. The U-phase windings bar U1 and bar U2, the V-phase windings bar V1 and bar V2, and the W-phase windings bar W1 and bar W2 are formed by reverse windings. The U-phase windings U1 and bar U1 are arranged at 180-degree opposing positions. In the same manner, the U-phase windings U2 and bar U2 are arranged at 180-degree opposing positions. The same applies to the other phases (V-phase and W-phase).

The U-phase windings U1, U2, bar U1, and bar U2 are connected in series. In the same manner, the V-phase windings V1, V2, bar V1, and bar V2 are connected in series, The W-phase windings W1, W2, bar W1, and bar W2 are connected in series. The U-phase windings U1, U2, bar U1, bar U2 are supplied with a U-phase drive current. This constantly excites the U-phased windings bar U1 and bar U2, which are reverse windings, with an inverted polarity (inverted phase) with respect to the U-phase windings U1 and U2, which are forward windings. However, the excitation timing is the same. The same applies to the other phases (V-phase and W-phase). The windings of each phase are supplied with drive current that is set assuming that the pole number of a rotor 31 is two times the number of the magnet poles Mn and Ms (i.e., ten poles in the present example).

The outer circumferential portion of the rotor 31 of the motor 30 includes a pole set Pa, in which three magnet poles Ms and two magnet poles Mn are alternately arranged next to one another in the circumferential direction, and five projections 24a to 24e of the rotor core 22. More specifically, the pole set Pa is arranged over one-half of the circumference of the rotor 31. The projections 24a to 24e are arranged in the remaining one-half range. The projections 24a to 24e are respectively opposite to the magnet poles Mn and Ms in the circumferential direction.

In the above configuration, during high-speed rotation of the rotor 31 (during field weakening control), for example, when the U-phase winding U1 is opposed in the radial direction to the S-magnet pole Ms, the projection 24a of the rotor core 22 is opposed in the radial direction to the U-phase winding bar U1 (refer to FIG. 7) at the opposite side in the circumferential direction. That is, the magnet pole Ms and the projection 24a are simultaneously opposed to the U-phase windings U1 and bar U1 that are excited in inverted phases (synchronously).

In this case, the U-phase windings U1 and bar U1 are supplied with field weakening current. However, in the U-phase winding U1, the flux of the opposing magnet pole Ms (flux toward radially inner side) exceeds the flux linkage (flux linkage toward radially outer side), and the flux linkage φx is generated passing through the U-phase winding U1 toward the radially inner side.

With regard to the U-phase winding bar U1, the opposing portion of the rotor 31 is the projection 24a of the rotor core 22. Thus, the flux linkage φy resulting from the field weakening current is not eliminated, and the flux linkage φy passes through the U-phase winding bar U1 toward the radially outer side. In this manner, the flux linkage φy is generated at the U-phase winding bar U1. The flux linkage φy has a phase inverted from the flux linkage φx generated at the U-phase winding U1 by the magnet pole Ms. As a result, the induced voltage generated at the U-phase winding bar U1 by the flux linkage φy has an inverted polarity (inverted phase) with respect to the induced voltage generated at the U-phase winding U1 by the flux linkage φx. This reduces the combined induced voltage at the U-phase windings U1 and bar U1. In this manner, the combined induced voltage of each phase is reduced. Thus, the rotation speed of the motor 30 can be increased.

The arrangement of the magnet poles Mn and Ms and the projections 24a to 24e of the rotor 31 will now be described.

Figure 8:
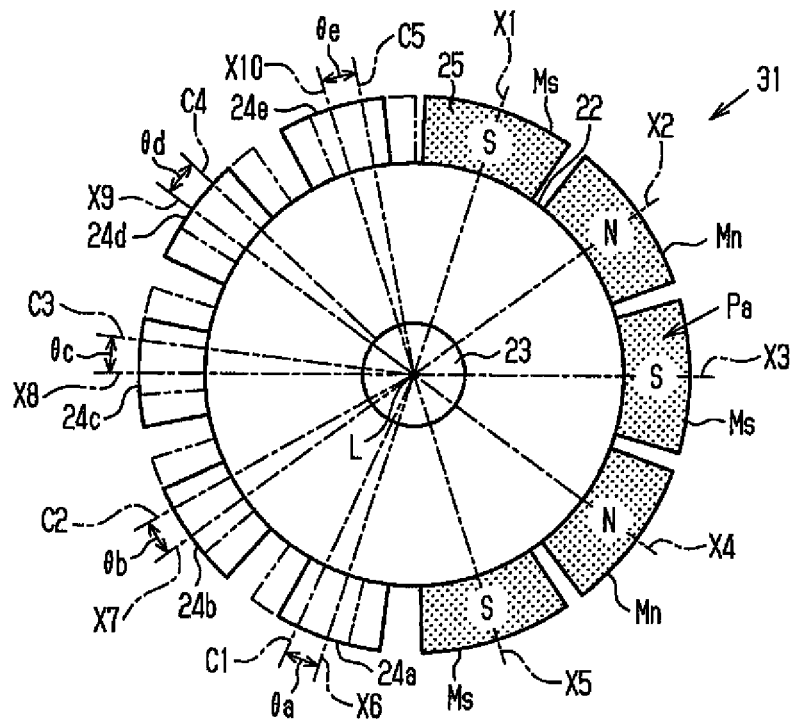
FIG. 8 is a plan view showing the arrangement pattern of magnet poles and projections in the rotor of the further example.

In the same manner as in the above embodiment, when n represents the total number of the magnet poles Mn and Ms, a 2n number of reference lines extends from the rotational axis of the rotor 31 (axis L of rotation shaft 23) in the radial direction. The reference lines are set at equal angular intervals in the circumferential direction. In the rotor 31 of this example, as shown in FIG. 8, the total number of the magnet poles Mn and Ms is five. Thus, ten reference lines X1 to X10 are set at equal intervals of 36° in order in the clockwise direction.

The magnet poles Mn and Ms each have a circumferential center arranged to be aligned with one of the reference lines X1 to X10.

More specifically, the circumferential centers of the three S-magnet poles Ms are arranged to be aligned with the reference lines X1, X3, and X5, respectively. The circumferential centers of the two N-magnet poles Mn are arranged to be aligned with the reference lines X2 and X4, respectively. That is, the intervals (open angles) between the circumferential centers of the magnet poles Mn and Ms are set to 36°.

On the other hand, the projections 24a to 24e respectively have circumferential centers C1 to C5, which are misaligned with any one of the reference lines X1 to X10. Examples of arrangement patterns of the projections 24a to 24e will be described below.

In the description below, θa represents the misalignment angle of the circumferential center C1 of the projection 24a with the reference line X6, θb represents the misalignment angle of the circumferential center C2 of the projection 24b with the reference line X7, θc represents the misalignment angle of the circumferential center C3 of the projection 24c with the reference line X8, θd represents the misalignment angle of the circumferential center C4 of the projection 24d with the reference line X9, and θe represents the misalignment angle of the circumferential center C5 of the projection 24e with the reference line X10. A misalignment angle in the clockwise direction has a positive value.

Fifth Arrangement Pattern
θa>0°
θb=θa
θc=0°
θd<0°
θe=θd
Sixth Arrangement Pattern
θa<0°
θb=θa
θc=0°
θd>0°
θe=θd
Seventh Arrangement Pattern
θa>0°, θb<0°
θc=0°
θd=θa
θe=θb
Eighth Arrangement Pattern
θa<0°, θb>0°
θc=0°
θd=θa
θe=θb
Ninth Arrangement Pattern
θa>0°, θb>0°θc>0°, θd>0° θe>0°
Tenth Arrangement Pattern
θa<0°, θb<0°θc<0°, θd<0° θe<0°
Eleventh Arrangement Pattern
θa+θb+θc+θd+θe=0° (where all of θa to θd are set to different values)

The settings of the open angles θn and θs of the outer circumferential surfaces 26 and 27 of the magnet poles Mn and Ms and the open angles θ1 to θ5 of the outer circumferential surfaces 28 of the projections 24a to 24e will now be described with reference to FIG. 9.

The open angles θn and θs of the magnet poles Mn and Ms are set to be equal to each other. The open angles θ1 to θ5 of the projections 24a to 24e are set to be smaller than the open angles θn and θs. Examples of setting patterns of the open angles θ1 to θ5 of the projections 24a to 24e will be described below.

Fourth Open Angle Setting Pattern
θn=θs=α
θ1=θ2=θ3=θ4=θ5=β
β<α
Fifth Open Angle Setting Pattern
θ1=θ2=θ3=θ4=θ5=α
α<θs<θn In the fourth and fifth setting patterns, the open angles θ1 to θ5 of the projections 24a to 24e are set to be equal to each other. Instead, the open angles θ1 to θ5 may all be set to different values.

Figure 9:
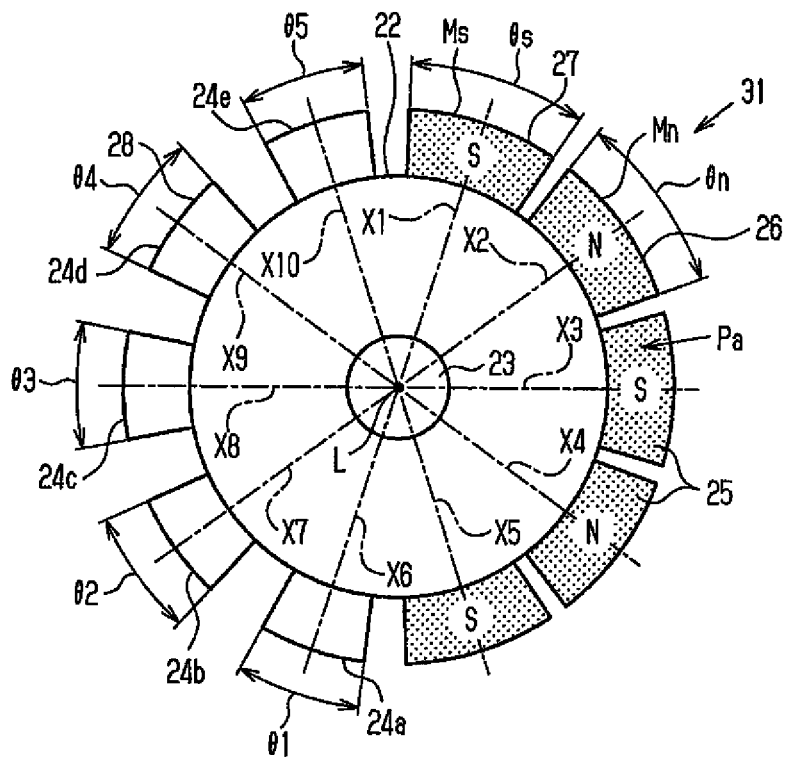
FIG. 9 is a plan view showing the setting pattern of open angles of the magnet poles and the projections in the rotor of the further example.

In the structure shown in FIG. 9, the circumferential centers of the projections 24a to 24e are aligned with the reference lines X6 to X10, respectively. However, the structure may include the combination of one of the fifth to eleventh arrangement patterns and one of the fourth and fifth open angle setting patterns.

In the structure shown in FIG. 7, the number of the magnet poles Mn and Ms may be changed. For example, the structure may include three magnet poles Mn and two magnet poles Ms.

Figure 10:
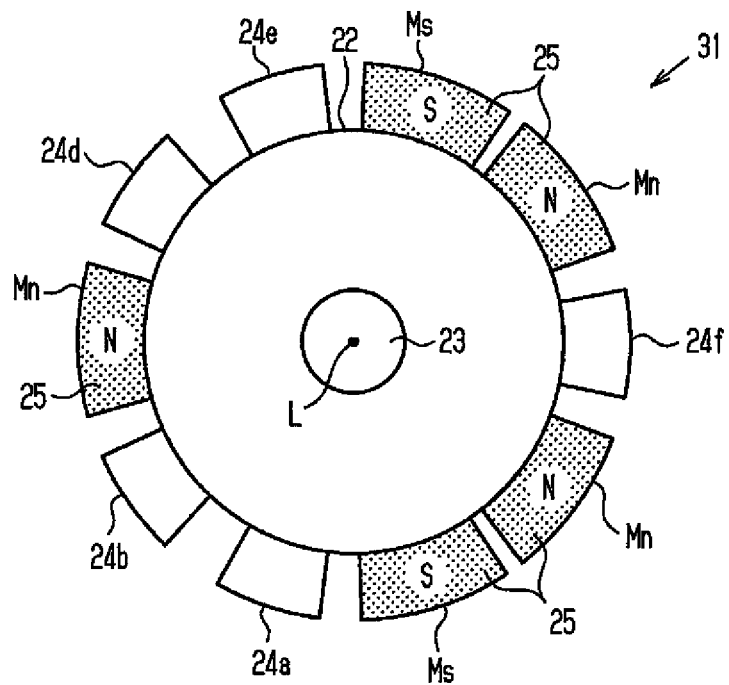
FIG. 10 is a plan view of a rotor in a further example.

Further, the arrangement of the magnet poles Mn and Ms and the projections 24a to 24e of the rotor 31 is not limited to the arrangement of the example shown in FIG. 7 and can be changed to the structure shown in, for example, FIG. 10 as long as the projections of the rotor core 22 are located at the circumferentially opposite side of the magnet poles Mn and Ms.

In the structure of FIG. 10, a projection 24f is formed by projecting from the rotor core 22 in lieu of the middle magnet pole Ms in the pole set Pa of the structure shown in FIG. 7, and the magnet poles Mn (N-pole permanent magnets 25) are arranged at the circumferentially opposite sides of the projection 24f. This structure has the same advantages as the structure shown in FIG. 7. Further, in comparison with the structure shown in FIG. 7, the rotor 31 is well-balanced in magnetic and mechanical terms.

In the stator 11, the U-phase windings U1, U2, bar U1, and bar U2 do not all have to be connected in series. Further, the windings U1 and bar U1 may form a series-connected pair that is separate from the series-connected pair of the windings U2 and bar U2. The same changes may be made for the V-phase and the W-phase.

Further, FIG. 7 shows an example in which the total number of the magnet poles Mn and Ms and the number of the windings 13 have a 5:12 relationship. However, the present invention is also applicable to a structure having a 7:12 relationship. Further, the present invention is applicable to a structure in which the total number of the magnet poles Mn and Ms and the number of the windings 13 in 5:12 (or 7:12) are multiplied by the same number.

Figure 11:
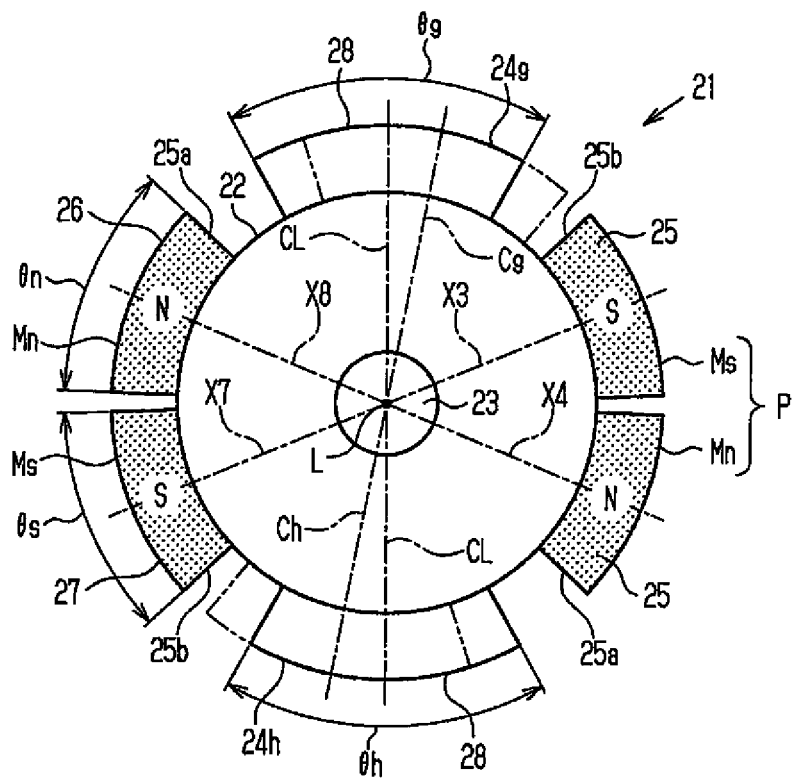
FIG. 11 is a plan view of a rotor in a further example.

In the above embodiment, a plurality of (two) projections (pair of projections 24a and 24b and pair of projections 24c and 24d) are arranged between the N-magnet pole Mn and the S-magnet pole Ms (between magnet pole pairs P) in the circumferential direction of the rotor 21. Instead, for example, as shown in FIG. 11, one projection 24g and one projection 24h may each be arranged between the N-magnet pole Mn and the S-magnet pole Ms.

The arrangement of the projections 24g and 24h in the structure of FIG. 11 will now be described. The arrangement of the magnet poles Mn and Ms is the same as the above embodiment.

The projections 24g and 24h respectively have circumferential centers Cg and Ch, which are misaligned with a circumferential center line CL extending between the magnet poles Mn and Ms. The circumferential center line CL is the center line between a circumferential end surface 25a of each N-magnet pole Mn (permanent magnet 25) located toward the projections (end surface opposite to S-magnet pole Ms) and a circumferential end surface 25b of each S-magnet pole Ms (permanent magnet 25) located toward the projections (end surface opposite to N-magnet pole Mn) in the circumferential direction of the rotor 21.

The circumferential centers Cg and Ch of the projections 24g and 24h are set to be misaligned with the circumferential center line CL in the clockwise direction or the counterclockwise direction. The circumferential center Cg of the projection 24g and the circumferential center Ch of the projection 24h do not necessarily have to be set to have the same misalignment angle with the circumferential center line CL and may have different misalignment angles.

In the structure shown in FIG. 11, the open angles θn and θs of the outer circumferential surfaces 26 and 27 of the magnet poles Mn and Ms are set to be equal to each other. The open angles θg and θh of the outer circumferential surfaces 28 of the projections 24g and 24h are set to differ from the open angles θn and θs of the magnet poles Mn and Ms.

With an arrangement setting and an open angle setting of the projections 24g and 24h such as those described above, in a structure in which the one projection 24g and the one projection 24h are arranged between the magnet pole pairs P in the circumferential direction, the phase of cogging torque generated during rotation of the rotor 21 may be shifted. This limits maximization of the cogging torque at a particular frequency. Consequently, the vibration generated by cogging torque is limited.

A structure in which one projection is each arranged between magnet poles in the circumferential direction such as that described above and the arrangement and open angle setting of the projections are applicable to rotor constructions such as those shown in FIGS. 7 and 10.

In the above embodiment, the outer circumferential surfaces of the projections 24a to 24d and the outer circumferential surfaces of the magnet poles Mn and Ms (permanent magnets 25) are arcuate and lie along the same circle extending about the axis L as viewed in the direction of the axis L. That is, the projections 24a to 24d and the magnet poles Mn and Ms have the same outer diameter. Instead, the projections 24a to 24d and the magnet poles Mn and Ms may have different outer diameters.

Figure 12:
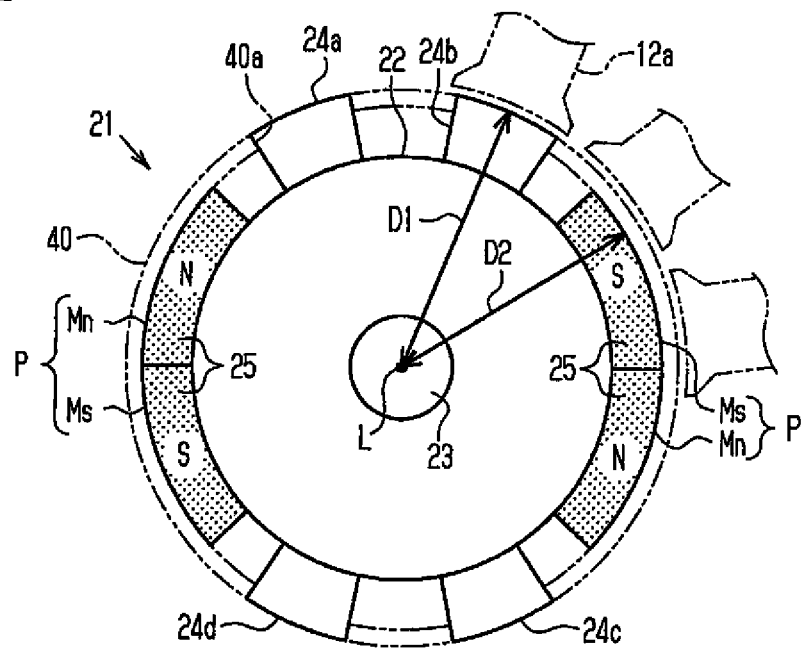
FIG. 12 is a plan view of a rotor in a further example.

For example, as shown in FIG. 12, the outer diameter D1 of the projections 24a to 24d may be set to be greater than the outer diameter D2 of the magnet poles Mn and Ms (permanent magnets 25). In the example shown in FIG. 12, the outer circumferential surfaces of the projections 24a to 24d are arcuate and extend about the axis L as viewed in the direction of the axis L. The projections 24a to 24d have the same outer diameter D1. The outer circumferential surfaces of the magnet poles Mn and Ms are arcuate and extend about the axis L as viewed in the direction of the axis L. The magnet poles Mn and Ms have the same outer diameter D2.

With this structure, the projections 24a to 24d are spaced apart from the inner circumferential surfaces of the teeth 12a of the stator by smaller air gaps (voids) than the magnet poles Mn and Ms. That is, the projections 24a to 24d are located closer to the inner circumferential surfaces of the teeth 12a and thus increase the flux linkage φy (refer to FIG. 1) resulting from the field weakening current. As a result, the combined induced voltage is further reduced at each phase. This contributes to rotating the motor 10 at a further higher speed.

It is preferred that the rotor 21 having an SPM structure include a cover 40 that prevents separation of the permanent magnets 25. In the structure shown in FIG. 12, the outer diameter D2 of the permanent magnets 25 is smaller than the outer diameter D1 of the projections 24a to 24d. The cover 40 has openings 40a that expose the outer circumferential surfaces of the projections 24a to 24d. Thus, the cover 40 may be arranged on the outer circumferences of the permanent magnets 25 while keeping the air gaps small between the projections 24a to 24d and the teeth 12a. This is further preferable.

In this example, the outer circumferential surfaces of the projections 24a to 24d and the outer circumferential surfaces of the magnet poles Mn and Ms are arcuate and extend about the axis L. That is, the distance from the axis L to the outer circumferential surfaces of the projections 24a to 24d is uniform in the circumferential direction. In the same manner, the distance from the axis L to the outer circumferential surfaces of the magnet poles Mn and Ms is uniform in the circumferential direction. However, the outer circumferential surfaces of the projections 24a to 24d and the magnet poles Mn and Ms are not limited to such shapes. The distances from the axis L to the outer circumferential surfaces may be non-uniform in the circumferential direction. In this case, the distance at which the outer circumferential surface of each of the projections 24a to 24d is separated from the axis L by the longest distance is defined as the outermost diameter of the projection. Also, the distance at which the outer circumferential surface of each of the magnet poles Mn and Ms is separated from the axis L by the longest distance is defined as the outermost diameter of the magnet pole. It is preferred that the outermost diameters of the projections 24a to 24d be set to be greater than the outermost diameters of the magnet poles Mn and Ms. In the example shown in FIG. 12, the outer circumferential surfaces of the projections 24a to 24d and the outer circumferential surfaces of the magnet poles Mn and Ms are arcuate and extend about the axis L. Thus, the outer diameters D1 and D2 are the outermost diameters of the projections 24a to 24d and the magnet poles Mn and Ms, respectively.

Figure 13:
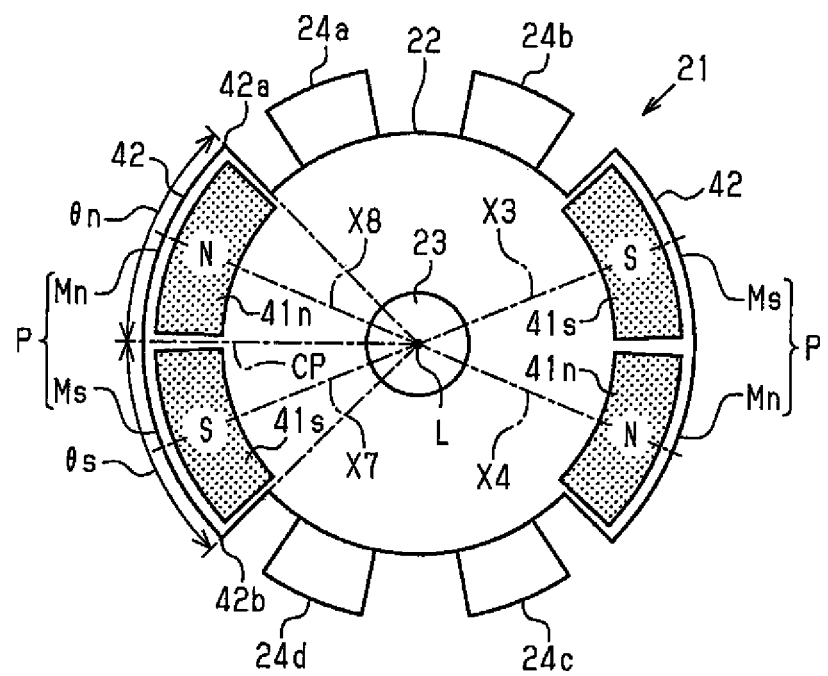
FIG. 13 is a plan view of a rotor in a further example.

As shown in FIG. 13, the present invention is applicable to an interior magnet structure (IPM structure) in which permanent magnets 41n and 41s forming the magnet poles Mn and Ms are embedded in the rotor core 22. In such an IPM structure, the arrangement of the magnet poles Mn and Ms and the projections 24a to 24d and the open angles of the magnet poles Mn and Ms and the projections 24a to 24d may be set in the same manner as in the above embodiment.

In the structure shown in FIG. 13, the rotor core 22 includes two protrusions 42 projecting toward the outer circumference. Each of the protrusions 42 includes a magnet pole pair P (magnet poles Mn and Ms). That is, the permanent magnet 41n (permanent magnet having N-pole toward outer circumference) forming the N-magnet pole Mn and the permanent magnet 41s (permanent magnet having S-pole toward outer circumference) forming the S-magnet pole Ms are embedded in each protrusion 42 of the rotor core 22.

The permanent magnets 41n and 41s are arcuate and extend about the axis L of the rotation shaft 23. The circumferential centers of the N-pole permanent magnets 41n are respectively aligned with the reference lines X4 and X8. The circumferential centers of the S-pole permanent magnets 41s are respectively aligned with the reference lines X3 and X7.

In the structure shown in FIG. 13, the outer circumferential surfaces of the protrusions 42 are arcuate and lie along the same circle extending about the axis L. The open angles of the outer circumferential surfaces of the protrusions 42 are set to 90°. Additionally, in this example, each protrusion 42 has a circumferential center position CP that is between the N-pole permanent magnet 41n and the S-pole permanent magnet 41s (boundary position between adjacent ones of magnet poles Mn and Ms) and configured to be aligned with the circumferential center position of the protrusion 42. The open angles θn and θs of the magnet poles Mn and Ms each correspond to the angle from the circumferential center position CP, located between the permanent magnets 41n and 41s, to the corresponding one of circumferentially opposite ends 42a and 42b of the outer circumferential surface of the protrusion 42. That is, the open angles θn and θs of the magnet poles Mn and Ms included in each protrusion 42 are each set to one-half of the open angle of the protrusion 42. In this example, the open angles θn and θs of the magnet poles Mn and Ms are each set to 45°.

Figure 14:
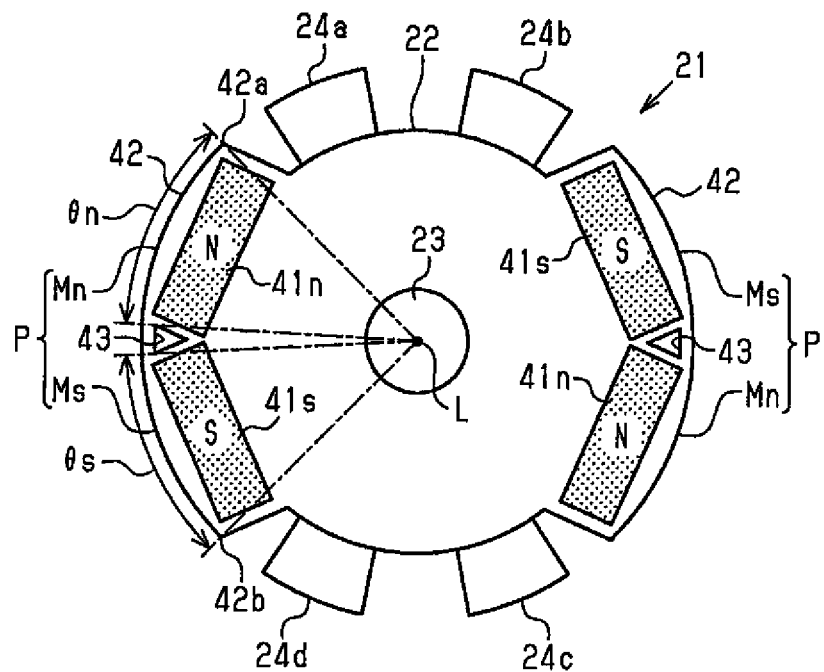
FIG. 14 is a plan view of a rotor in a further example.

FIG. 14 shows the rotor 21 in which the structure shown in FIG. 13 is modified. Each protrusion 42 of the rotor core 22 has a reluctance hole 43 between the permanent magnets 41n and 41s. In the structure shown in FIG. 14, the permanent magnets 41n and 41s are each rectangular in an axial view and arranged so that the surfaces having the longer sides (radially inner surfaces) are orthogonal to the radial direction of the rotor 21 as viewed in the axial direction. The reluctance holes 43 are shaped in accordance with the end shapes of the permanent magnets 41n and 41s. In this example, each reluctance hole 43 substantially has the form of a triangle such that one of the vertices is directed toward a radially inner side in an axial view. The reluctance holes 43 limit the generation of short-circuit flux at the permanent magnets 41n and 41s (short-circuiting flux passing through rotor core 22). In a structure in which the protrusions 42 have the reluctance holes 43 like in this example, the open angle θn of each magnet pole Mn corresponds to the angle from one circumferential end of the reluctance hole 43 to one circumferential end 42a of the outer circumferential surface of the protrusion 42. The open angle θs of each magnet pole Ms corresponds to the angle from the other circumferential end of the reluctance hole 43 to the other circumferential end 42b of the outer circumferential surface of the protrusion 42.

In the magnet poles Mn and Ms having the structure shown in FIG. 14, the permanent magnets 41n and 41s are each rectangular in an axial view. Instead, the permanent magnets 41n and 41s may be, for example, arcuate and extend about the axis L.

Figure 15:
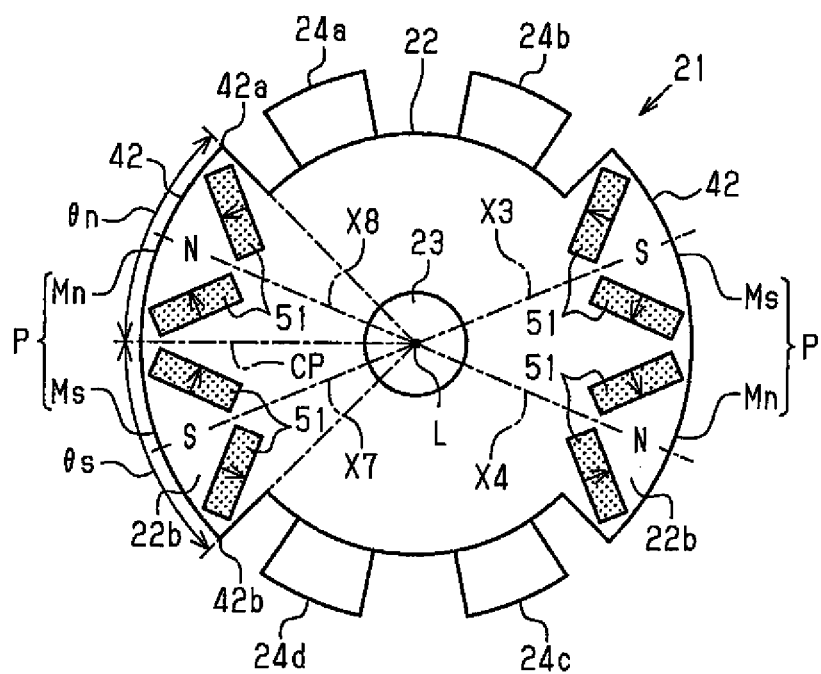
FIG. 15 is a plan view of a rotor in a further example.

The magnet poles Mn and Ms may have a magnet configuration such as that shown in FIG. 15. In the configuration shown in the drawing, each of the magnet poles Mn and Ms includes two permanent magnets 51 embedded in the rotor core 22 (protrusion 42). The permanent magnets 51 are each a parallelepiped. In each of the magnet poles Mn and Ms, the two permanent magnets 51 are arranged in a generally V-shaped layout that widens toward the outer circumference in an axial view. Additionally, the two permanent magnets 51 are arranged in line-symmetry with respect to the circumferential center line in the circumferential direction. Thus, in the case of the present example, the two line-symmetric permanent magnets 51 have a symmetry axis extending through the circumferential center of the magnet poles Mn and Ms. The magnet poles Mn and Ms are arranged in the same manner as the above embodiment. The circumferential centers of the N-pole magnet poles Mn (symmetry axis of permanent magnets 51) are aligned with the reference lines X4 and X8, respectively. The circumferential centers of the S-pole magnet poles Ms (symmetry axis of permanent magnets 51) are aligned with the reference lines X3 and X7, respectively. The two permanent magnets 51 are arranged in each of the magnet poles Mn and Ms to be included within an angle range circumferentially dividing the protrusion 42 into two halves (45-degree range in this example).

In FIG. 15, the arrows in solid lines indicate the magnetizing direction of the permanent magnets 51 in the N-pole magnet pole Mn and the S-pole magnet pole Ms. The distal side of the arrow indicates the N-pole, and the basal side of the arrow indicates the S-pole. As shown by the arrows, the permanent magnets 51 in the N-pole magnet poles Mn are magnetized so that the opposing surfaces (surfaces closer to pole center) function as the N-poles in order for the outer circumferential side of the magnet poles Mn to function as the N-poles. Further, the permanent magnets 51 in the S-pole magnet poles Ms are magnetized so that the opposing surfaces (surfaces closer to pole center) function as the S-poles in order for the outer circumferential side of the S-pole magnet poles Ms to function as the S-poles.

In such a structure of the magnet poles Mn and Ms, the two permanent magnets 51 are embedded in a generally V-shaped layout that widens outward in the radial direction in an axial view. This increases the volume of the rotor core at the outer circumferential side of the permanent magnets 51 (volume of portion including inter-magnet core part 22b located between permanent magnets 51 arranged in generally V-shaped layout). Thus, the reluctance torque is increased. This contributes to increasing the torque of the motor 10.

Figure 16:
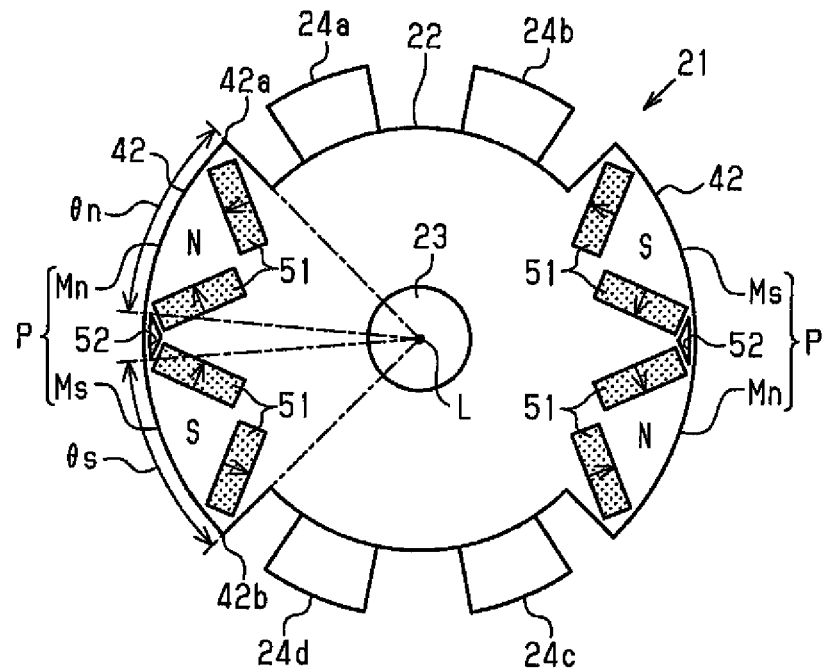
FIG. 16 is a plan view of a rotor in a further example.

FIG. 16 shows a rotor 21 having reluctance holes 52 like the reluctance holes 43 (refer to FIG. 14) in the protrusions 42 shown in the structure of FIG. 15. Each reluctance hole 52 is formed between outer circumferential ends of circumferentially adjacent ones of the permanent magnets 51 at a location between the N-magnet pole Mn and the S-magnet pole Ms formed in the protrusion 42. This limits the generation of short-circuit flux at the permanent magnets 51 (short-circuiting flux passing through rotor core 22). In this structure, the open angle θn of each magnet pole Mn corresponds to the angle from one circumferential end of the reluctance hole 52 to one circumferential end 42a of the outer circumferential surface of the protrusion 42. The open angle θs of each magnet pole Ms corresponds to the angle from the other circumferential end of the reluctance hole 52 to the other circumferential end 42b of the outer circumferential surface of the protrusion 42.

Figure 17:
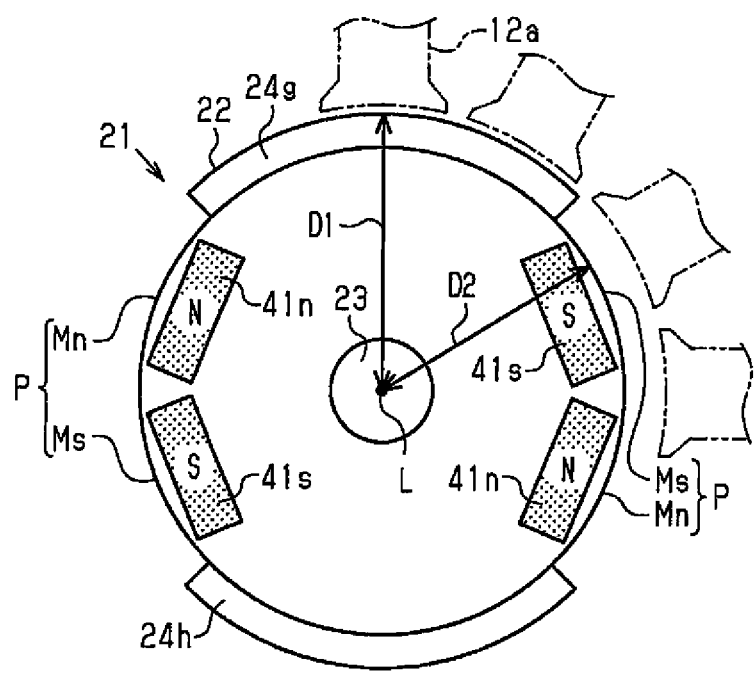
FIG. 17 is a plan view of a rotor in a further example.

As shown in FIG. 17, in the rotor 21 having an IPM structure, the outer diameter D1 of the projections 24g and 24h of the rotor core 22 may be set to be greater than the outer diameter D2 of the magnet poles Mn and Ms (outer diameter of rotor core 22 in magnet poles Mn and Ms). In this structure, the projections 24g and 24h are spaced apart from the inner circumferential surfaces of the teeth 12a of the stator by smaller air gaps (voids) than the magnet poles Mn and Ms. That is, the projections 24g and 24h are located closer to the inner circumferential surfaces of the teeth 12a and thus increase the flux linkage φy (refer to FIG. 1) resulting from the field weakening current. As a result, the combined induced voltage is further reduced at each phase. This contributes to rotating the motor 10 at a further higher speed.

The configurations shown in FIG. 17 may be changed in the magnet configuration of the magnet poles Mn and Ms and the configuration (e.g., number) of the projections located between the magnet pole pairs P. For example, the magnet configuration of the magnet poles Mn and Ms may be in a V-shaped layout as shown in FIGS. 15 and 16.

In the structure shown in FIG. 17, the outer circumferential surface of the rotor core 22 (outer circumferential surfaces of projections 24g and 24h and magnet poles Mn and Ms) is arcuate and extends about the axis L. However, there is no limit to such a configuration.

Figure 18:
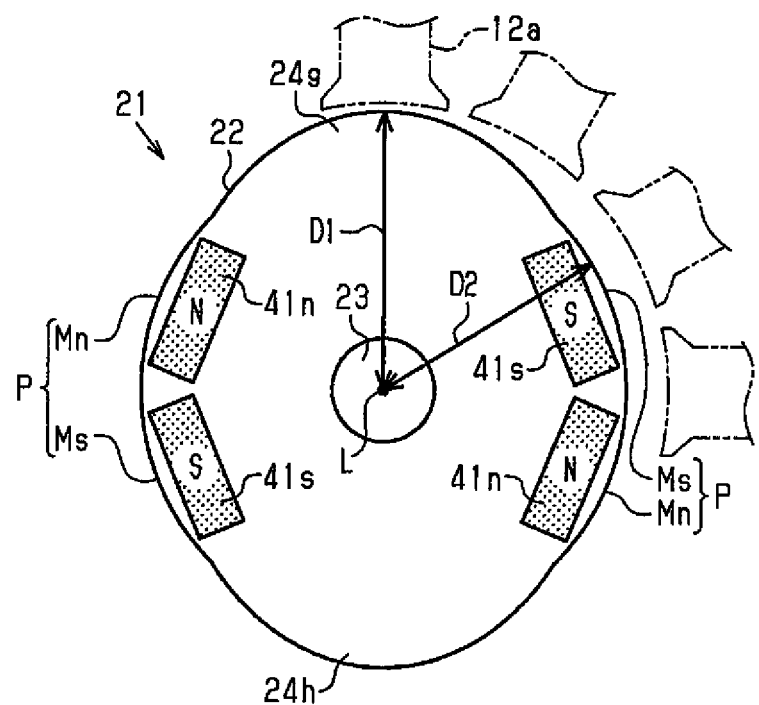
FIG. 18 is a plan view of a rotor in a further example.

For example, as shown in FIG. 18, the outer circumferential surfaces of the projections 24g and 24h may be elliptically arcuate and extend about the axis L. It is preferred that the projections 24g and 24h each have the maximum outer diameter (outer diameter D1) at the circumferential center position, and that the outer diameter D1 be set to be greater than the outer diameter D2 of the magnet poles Mn and Ms. In the example shown in the drawing, the outer circumferential surfaces of the magnet poles Mn and Ms are arcuate (outer diameter D2). The outer diameter of the projections 24g and 24h is configured to be entirely greater than the outer diameter D2 of the magnet poles Mn and Ms in the circumferential direction.

Figure 19:
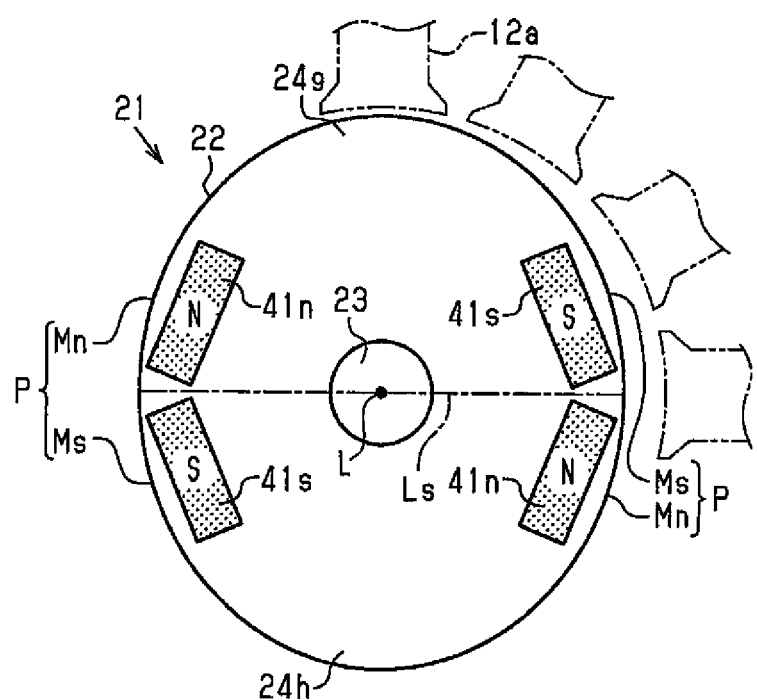
FIG. 19 is a plan view of a rotor in a further example.

In another example, as shown in FIG. 19, the entire circumference of the rotor core 22 may be elliptical and extend about the axis L. In this case, it is preferred that the boundary of the magnet poles Mn and Ms in each magnet pole pair P be configured to be aligned with the minor axis Ls of the elliptical rotor core 22. Even in this structure, the outer diameter of the projections 24g and 24h may be configured to be greater than the outer diameter of the magnet poles Mn and Ms.

With a structure such as those shown in FIGS. 18 and 19, the projections 24g and 24h are spaced apart from the inner circumferential surfaces of the teeth 12a of the stator by smaller air gaps (voids) than the magnet poles Mn and Ms. That is, the projections 24g and 24h are located closer to the inner circumferential surfaces of the teeth 12a and thus increase the flux linkage φy (refer to FIG. 1) resulting from the field weakening current. As a result, the combined induced voltage is further reduced at each phase. This contributes to rotating the motor 10 at a further higher speed.

Figure 20:
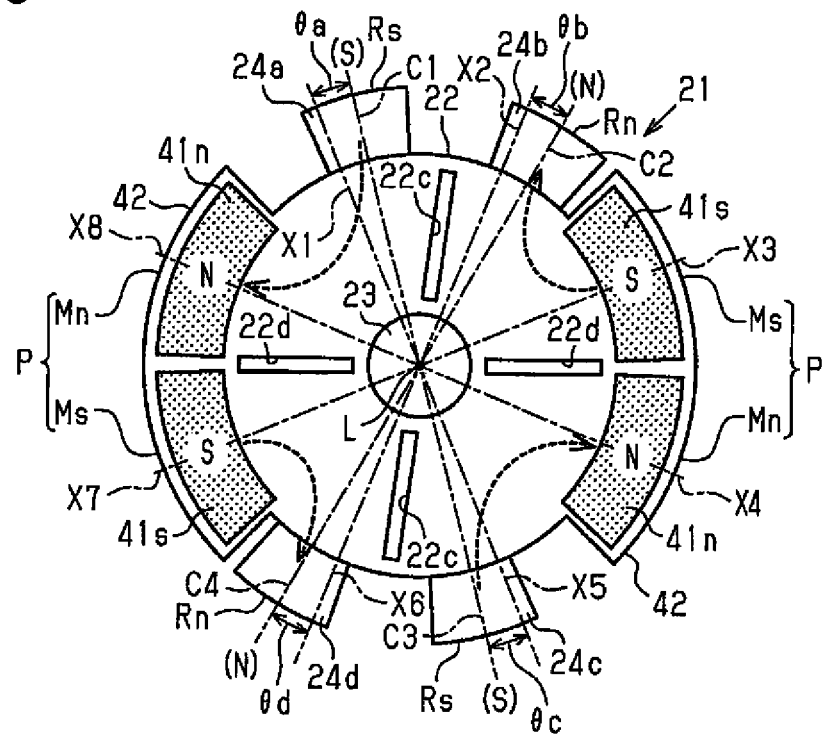
FIG. 20 is a plan view of a rotor in a further example.

FIG. 20 shows a structure in which the rotor core 22 of the rotor 21 having the IPM structure shown in FIG. 13 includes slits (refer to FIG. 5). As shown in FIG. 20, the rotor core 22 includes four slits 22c and 22d extending in the radial direction of the rotation shaft 23. The slits 22c are arranged between the projections 24a and 24b, which are adjacent to each other in the circumferential direction, and between the projections 24c and 24d, which are adjacent to each other in the circumferential direction. The slits 22d are arranged in the boundaries of circumferentially adjacent ones of the magnet poles Mn and Mn. The slits 22c and 22d extend through the rotor core 22 in the axial direction. Each of the slits 22c and 22d guides the flux of the permanent magnets 41n and 41s passing through the rotor core 22 to the circumferentially adjacent one of the projections 24a to 24d (see arrows in broken lines in drawing). Consequently, the projections 24a to 24d function as pseudo-magnet poles (core magnet poles). More specifically, each of the projections 24a and 24c, which is located adjacent to the N-magnet pole Mn in the circumferential direction, serves as an S-magnetic core pole Rs. Each of the projections 24b and 24d, which is located adjacent to the S-magnet pole Ms in the circumferential direction, serves as an N-magnetic core pole Rn.

In the structure shown in FIG. 20, the misalignment angles θa to θd of the projections 24a to 24d are set to be greater than zero degrees. That is, the projections 24a to 24d are located at positions misaligned with the reference lines X1, X2, X5, and X6, respectively, in the clockwise direction. In such a setting, it is preferred that the slits 22c be arranged in accordance with the misalignment angles θa to θd of the projections 24a to 24d rather than arranging the slits 22c and 22d at equal intervals in the circumferential direction. More specifically, it is preferred that one of the slits 22c be arranged in the center position between the circumferential centers C1 and C2 of the projections 24a and 24b in the circumferential direction and that the other one of the slits 22c be arranged in the center position between the circumferential centers C3 and C4 of the projections 24c and 24d in the circumferential direction. This allows for a configuration in which the slits 22c do not overlap with the projections 24a to 24d in the radial direction. As a result, the flux of each of the magnet poles Mn and Ms is preferably guided to the circumferentially adjacent one of the projections 24a to 24d. In the example shown in the drawing, the misalignment angles θa to θd of the projections 24a to 24d are all set to the same angle. However, there is no limit to such a configuration.

Figure 21:
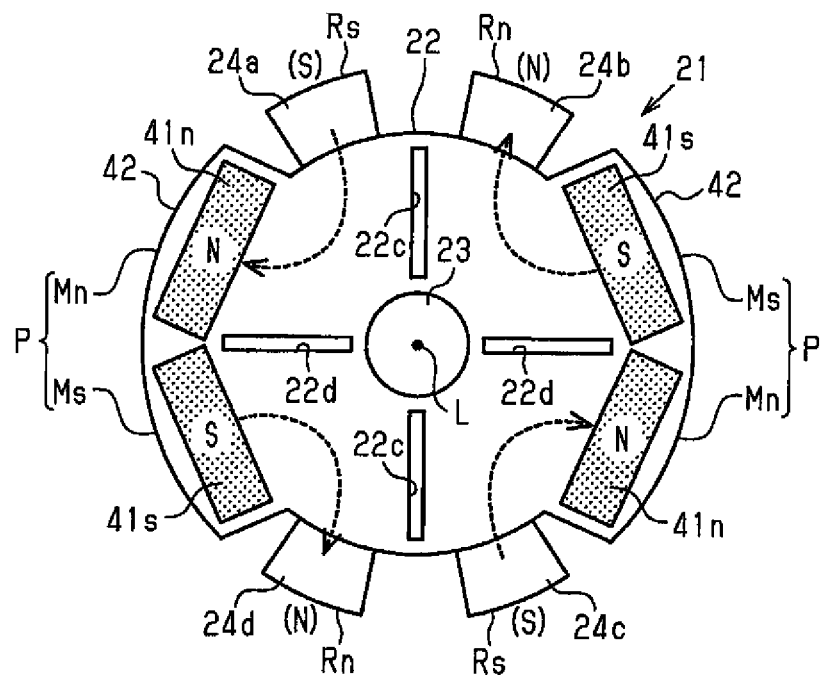
FIG. 21 is a plan view of a rotor in a further example.

In the example shown in FIG. 20, the permanent magnets 41n and 41s are arcuate and extend about the axis L of the rotation shaft 23. Instead, for example, as shown in FIG. 21, the permanent magnets 41n and 41s may be rectangular in an axial view. In the structure shown in FIG. 21, the permanent magnets 41n and 41s are arranged so that the surfaces having the longer sides (radially inner surfaces) are orthogonal to the radial direction of the rotor 21 as viewed in the axial direction.

Figure 22:
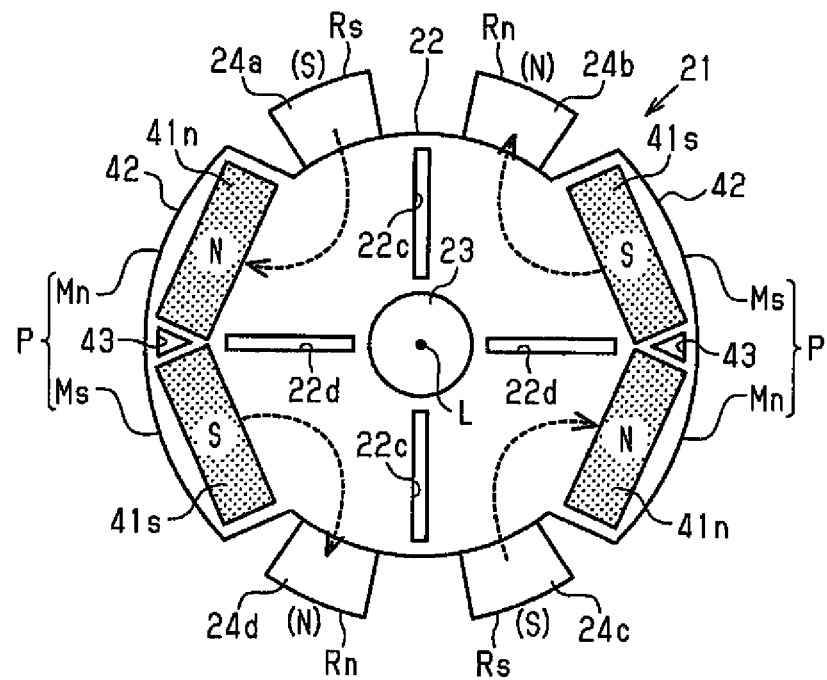
FIG. 22 is a plan view of a rotor in a further example.

FIG. 22 shows a structure in which the rotor core 22 of the rotor 21 having the IPM structure shown in FIG. 14 includes the slits 22c and 22d (refer to FIG. 20). In this structure, the slits 22c and 22d also guide the flux of each of the magnet poles Mn and Ms passing through the rotor core 22 to the circumferentially adjacent one of the projections 24a to 24d (see arrows in broken lines in drawing). Consequently, the projections 24a to 24d function as pseudo-magnet poles (magnetic core poles Rn and Rs).

Figure 23:
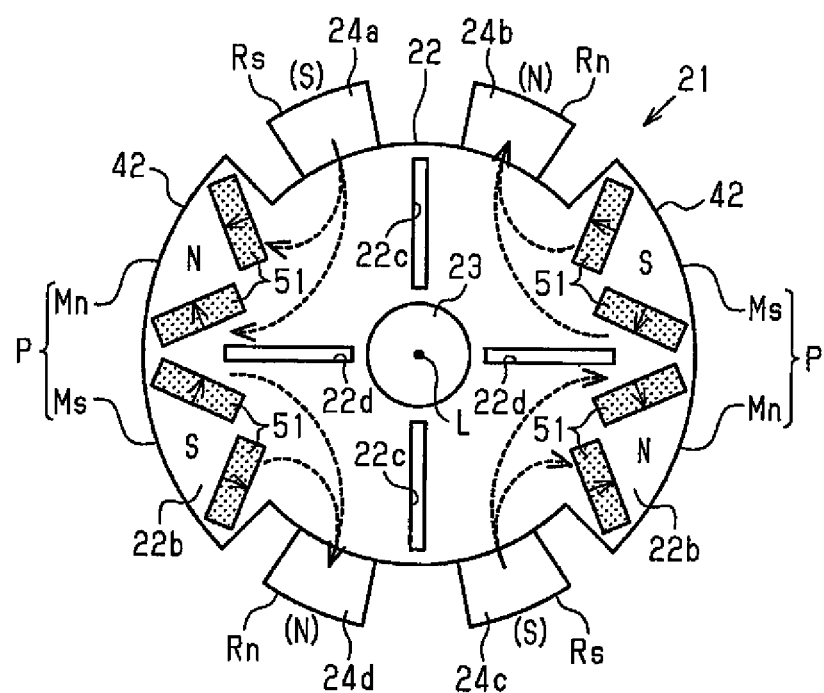
FIG. 23 is a plan view of a rotor in a further example.

FIG. 23 shows a structure in which the rotor core 22 of the rotor 21 having the IPM structure shown in FIG. 15 includes the slits 22c and 22d (refer to FIG. 20). In this structure, the slits 22c and 22d also guide the flux of each of the magnet poles Mn and Ms passing through the rotor core 22 to the circumferentially adjacent one of the projections 24a to 24d (see arrows in broken lines in drawing). Consequently, the projections 24a to 24d function as pseudo-magnet poles (magnetic core poles Rn and Rs).

In the structure shown in FIG. 23, the slits 22d are arranged in the boundaries of circumferentially adjacent ones of the magnet poles Mn and Mn. However, there is no limit to such a configuration. The structure, such as the arrangement of the slits 22d, may be changed. For example, in the structure shown in FIG. 24, a single slit 22d is arranged in each one of the magnet poles Mn and Ms. More specifically, the slits 22d respectively extend along the circumferential center lines (reference lines X3, X4, X7, and X8) of the magnet poles Mn and Ms. In this structure, the slits 22c and 22d also guide the flux of each of the magnet poles Mn and Ms passing through the rotor core 22 to the circumferentially adjacent one of the projections 24a to 24d (see arrows in broken lines in drawing). Consequently, the projections 24a to 24d function as pseudo-magnet poles (magnetic core poles Rn and Rs).

Figure 24:
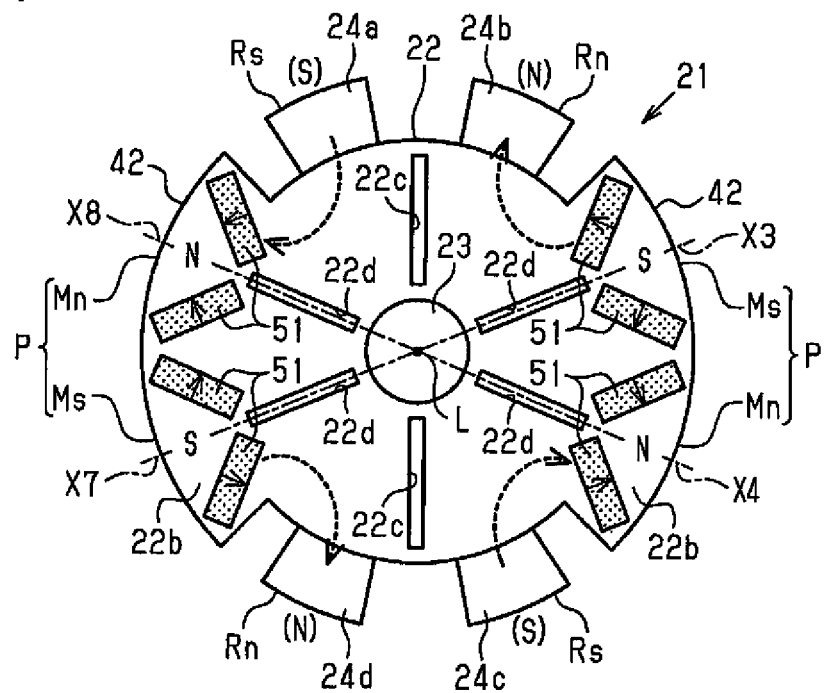
FIG. 24 is a plan view of a rotor in a further example.
Figure 25:
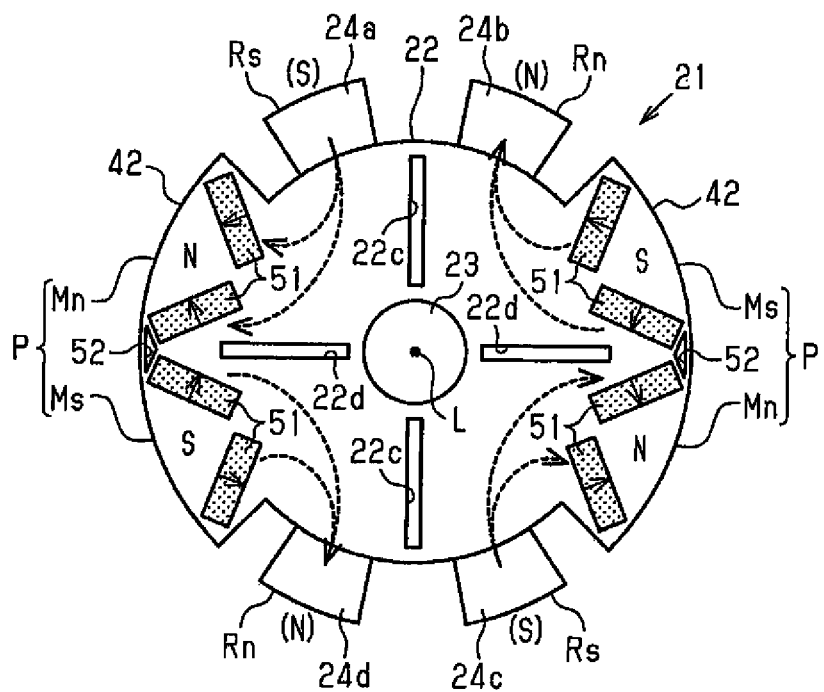
FIG. 25 is a plan view of a rotor in a further example.

FIG. 25 shows a structure in which the rotor core 22 of the rotor 21 having the IPM structure shown in FIG. 16 includes the slits 22c and 22d (refer to FIG. 20). In this structure, the slits 22c and 22d also guide the flux of each of the magnet poles Mn and Ms passing through the rotor core 22 to the circumferentially adjacent one of the projections 24a to 24d (see arrows in broken lines in drawing). Consequently, the projections 24a to 24d function as pseudo-magnet poles (magnetic core poles Rn and Rs). In the structure shown in the drawing, the slits 22d are arranged in the boundaries of circumferentially adjacent ones of the magnet poles Mn and Mn. Instead, as shown in FIG. 24, the slits 22d may extend along the circumferential center lines of the magnet poles Mn and Ms.

Figure 26:
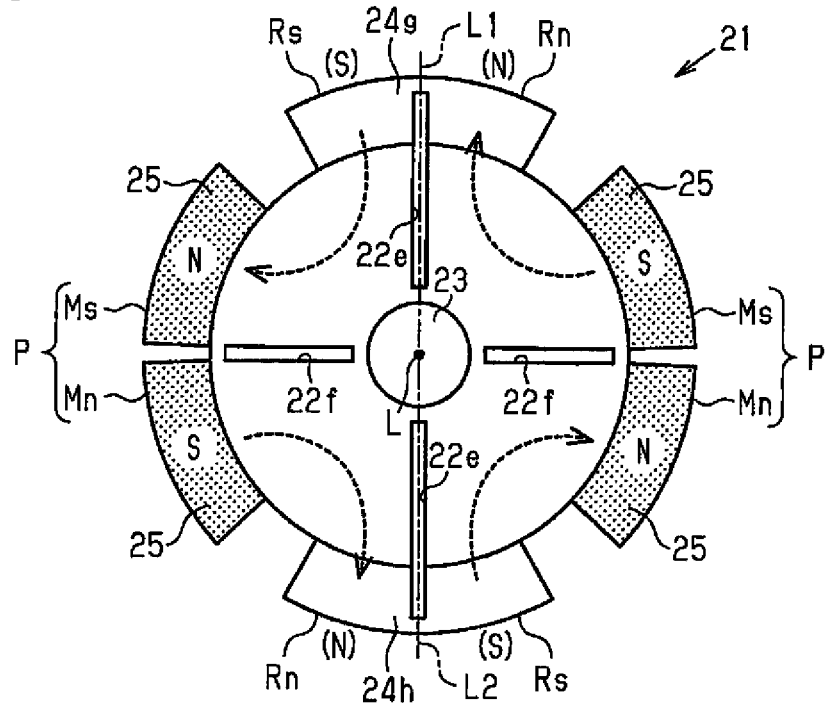
FIG. 26 is a plan view of a rotor in a further example.

FIG. 26 shows a structure in which the rotor core 22 of the rotor 21 shown in FIG. 11 includes four slits 22e and 22f extending in the radial direction of the rotation shaft 23. Two slits 22e each include a radially outer end portion configured to partially divide the corresponding one of the projections 24g and 24h of the rotor core 22 in the circumferential direction. More specifically, one of the slits 22e extends on a circumferential center line L1 of the projection 24g. The radially outer end portion of the slit 22e extends into the projection 24g. The other one of the slits 22e extends on a circumferential center line L2 of the projection 24h. The radially outer end portion of the slit 22e extends into the projection 24h. The slits 22f are arranged between boundaries of circumferentially adjacent ones of the magnet poles Mn and Mn. The slits 22e and 22f extend through the rotor core 22 in the axial direction.

In this structure, the slits 22*e* and 22*f* guide the flux of each N-magnet pole Mn to a portion of the corresponding one of the projections 24*g* and 24*h* located toward the magnet pole Mn from the slit 22*e* (see arrows in broken lines in drawing). Consequently, the portions of the projections 24*g* and 24*h* function as the S-magnetic core poles Rs. In the same manner, the slits 22*e* and 22*f* guide the flux of each S-magnet pole Ms to a portion of the corresponding one of the projections 24*g* and 24*h* located toward the magnet poles Ms from the slit 22*e* (see arrows in broken lines in drawing). Consequently, the portions of the projections 24*g* and 24*h* function as the N-magnetic core poles Rn.

Figure 27:
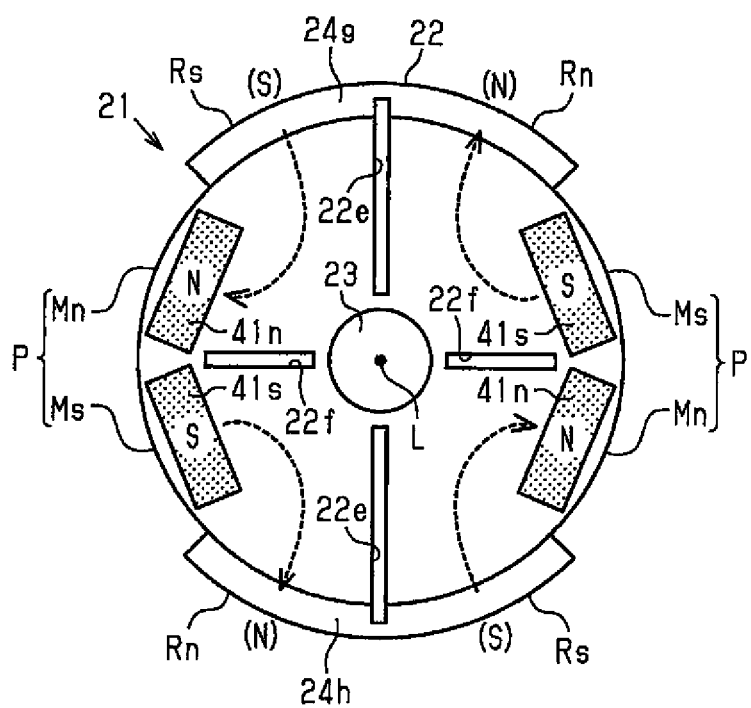
FIG. 27 is a plan view of a rotor in a further example.

FIG. 27 shows a structure in which the rotor core 22 of the rotor 21 shown in FIG. 17 includes the slits 22*e* and 22*f* (refer to FIG. 26). In this structure, the slits 22*e* and 22*f* also guide the flux of each of the magnet poles Mn and Ms. Consequently, the magnetic core poles Rn and Rs are formed in the projections 24*g* and 24*h* at opposite sides of each slit 22*e* in the circumferential direction.

Figure 28:
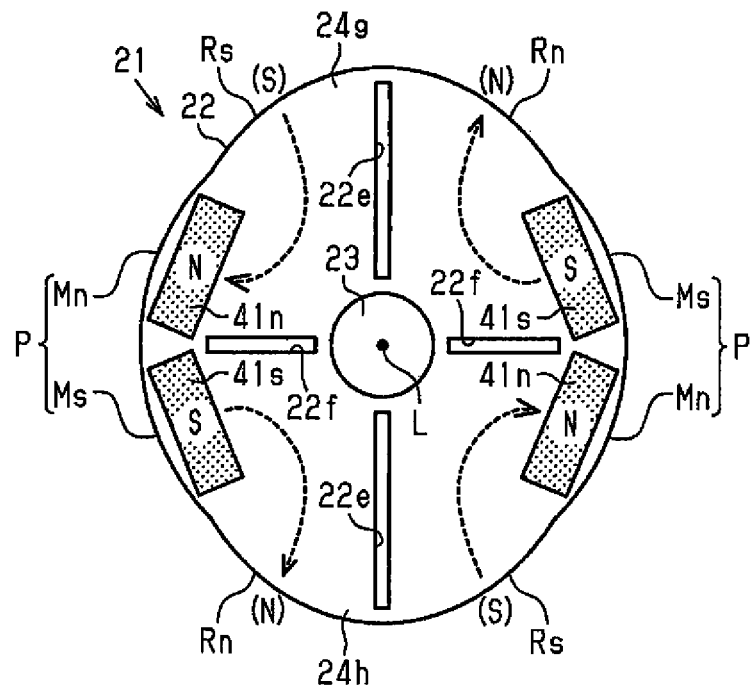
FIG. 28 is a plan view of a rotor in a further example.

FIG. 28 shows a structure in which the rotor core 22 of the rotor 21 shown in FIG. 18 includes the slits 22*e* and 22*f* (refer to FIG. 26). In this structure, the slits 22*e* and 22*f* also guide the flux of each of the magnet poles Mn and Ms. Consequently, the magnetic core poles Rn and Rs are formed in the projections 24*g* and 24*h* at opposite sides of each slit 22*e* in the circumferential direction.

Figure 29:
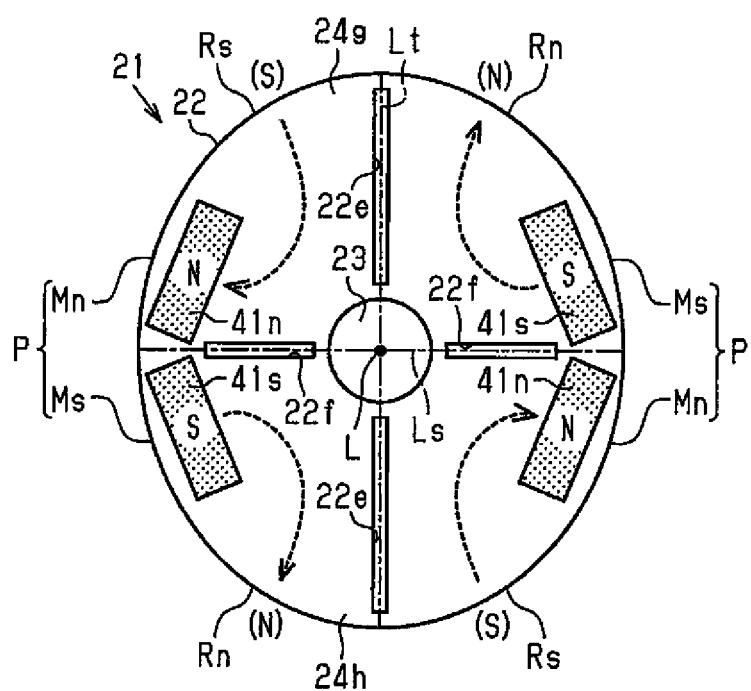
FIG. 29 is a plan view of a rotor in a further example.

FIG. 29 shows a structure in which the rotor core 22 of the rotor 21 shown in FIG. 19 includes the slits 22*e* and 22*f* (refer to FIG. 26). As shown in the drawing, it is preferred that the slits 22*f* be arranged in the boundary of the magnet poles Mn and Ms of each magnet pole pair P, that is, extend on the minor axis Ls of the elliptical rotor core 22. It is also preferred that the slits 22*e* extend on the major axis Lt of the elliptical rotor core 22. With this structure, the slits 22*e* and 22*f* also guide the flux of each of the magnet poles Mn and Ms. Consequently, the magnetic core poles Rn and Rs are formed in the projections 24*g* and 24*h* at opposite sides of each slit 22*e* in the circumferential direction.

Figure 30:
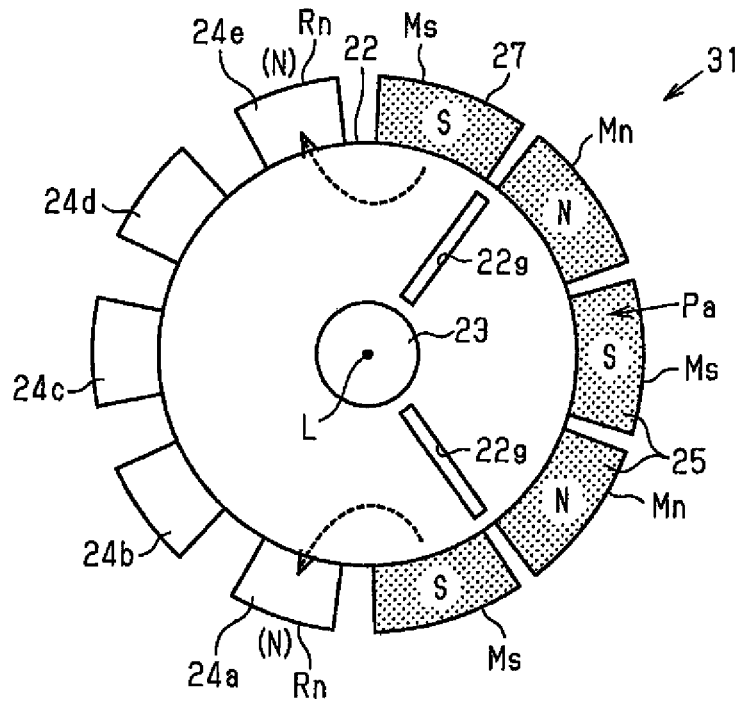
FIG. 30 is a plan view of a rotor in a further example.

FIG. 30 shows a structure in which the rotor core 22 of the rotor 31 shown in FIG. 7 includes two slits 22*g* extending in the radial direction of the rotation shaft 23. One of the slits 22*g* is arranged in the boundary between the magnet pole Ms located adjacent to the projection 24*e* and the magnet pole Mn located adjacent to the magnet pole Ms. The other one of the slits 22*g* is arranged in the boundary between the magnet pole Ms located adjacent to the projection 24*a* and the magnet pole Mn located adjacent to the magnet pole Ms. In this structure, the flux of each magnet pole Ms is guided by the immediate one of the slits 22*g* to the adjacent one of the projections 24*a* and 24*e*. Consequently, the projections 24*a* and 24*e* function as the N-magnetic core poles Rn.

Figure 31:
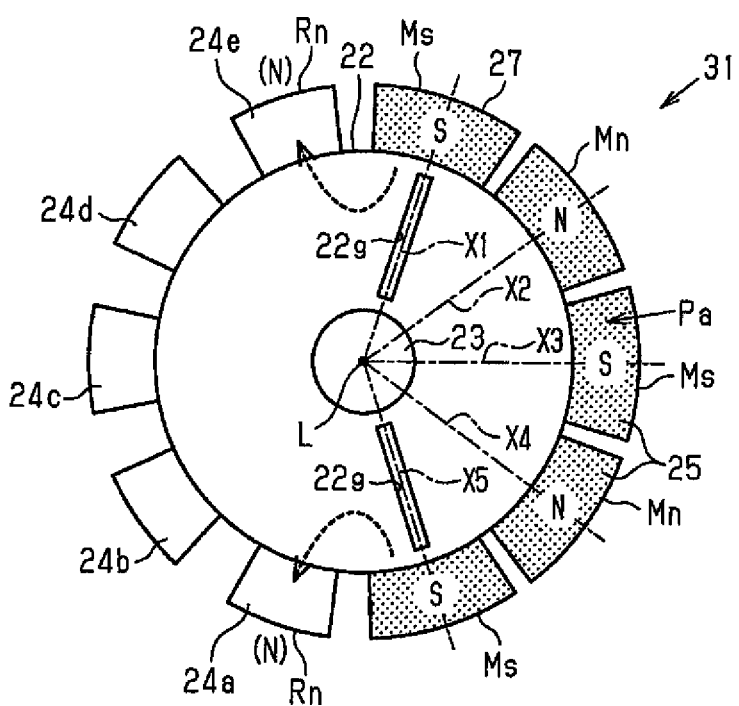
FIG. 31 is a plan view of a rotor in a further example.

Further, as shown in FIG. 31, one of the slits 22*g* may extend on the circumferential center line (reference line X1) of the magnet pole Ms located adjacent to the projection 24*e*. The other one of the slits 22*g* may extend on the circumferential center line (reference line X5) of the magnet pole Ms located adjacent to the projection 24*a*. With this structure, the slits 22*g* guide the flux of each magnet pole Ms to the adjacent one of the projections 24*a* and 24*e*. Consequently, the projections 24*a* and 24*e* function as the N-magnetic core poles Rn.

Figure 32:
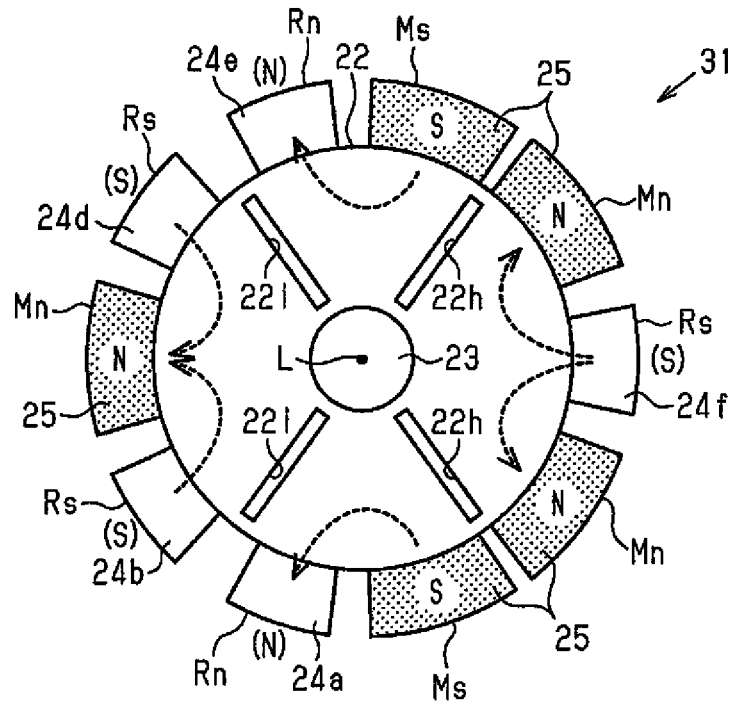
FIG. 32 is a plan view of a rotor in a further example.

FIG. 32 shows a structure in which the rotor core 22 of the rotor 31 shown in FIG. 10 includes four slits 22*h* and 22*i* extending in the radial direction of the rotation shaft 23. Two slits 22*h* are respectively arranged in boundaries of circumferentially adjacent ones of the magnet poles Mn and Ms. Two slits 22*i* are respectively arranged between the projections 24*a* and 24*b*, which are adjacent to each other in the circumferential direction, and the projections 24*d* and 24*e*, which are adjacent to each other in the circumferential direction.

With this structure, the flux rectifying effect of the slits 22*h* and 22*i* allows the projections 24*a*, 24*b*, 24*d*, 24*e*, and 24*f* to function as pseudo-magnet poles (core magnet poles). More specifically, the projections 24*a* and 24*e*, which are adjacent to the corresponding one of the S-magnet poles Ms, function as the N-magnetic core poles Rn due to the flux rectifying effect of the slits 22*h* and 22*i*. Also, the projections 24*b* and 24*d*, which are located at opposite sides of the N-magnet pole Mn in the circumferential direction, function as the S-magnetic core poles Rs due to the flux rectifying effect of the slits 22*i*. Further, the projection 24*f*, which is located between the N-magnet poles Mn in the circumferential direction, functions as the S-magnetic core pole Rs due to the flux rectifying effect of the slits 22*h*.

Figure 33:
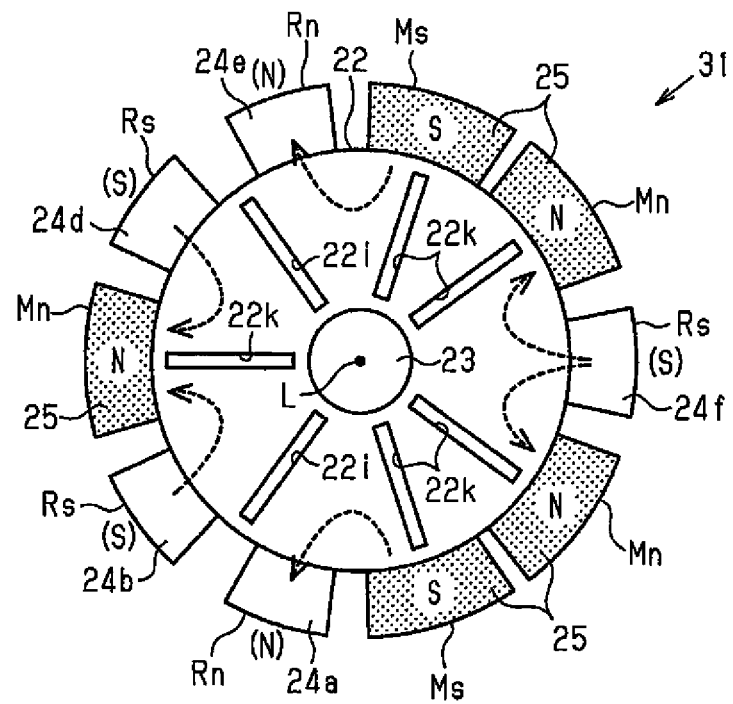
FIG. 33 is a plan view of a rotor in a further example.

The structure, such as the arrangement of the slits, is not limited to that shown in FIG. 32 and may be changed as shown in FIG. 33. In the structure shown in FIG. 33, the two slits 22*i* are respectively arranged between the projections 24*a* and 24*b*, which are adjacent to each other in the circumferential direction, and the projections 24*d* and 24*e*, which are adjacent to each other in the circumferential direction, in the same manner as the structure of FIG. 32. Additionally, the rotor core 22 includes slits 22*k* extending in the radial direction in conformance with the circumferential center of each of the magnet poles Mn and Ms. With this structure, the projections 24*a*, 24*b*, 24*d*, 24*e*, and 24*f* also function as pseudo-magnet poles (magnetic core poles Rn and Rs) due to the flux rectifying effect of the slits 22*i* and 22*k*.

In the above embodiment, the permanent magnets 25 are sintered magnets but instead may be, for example, bonded magnets.

In the above embodiment, the present invention is embodied in an inner-rotor type motor 10 in which the rotor 21 is located toward the inner circumference of the stator 11. Instead, the present invention may be embodied in an outer-rotor type motor in which the rotor is located toward the outer circumference of the stator.

In the above embodiment, the present invention is embodied in a radial-gap type motor 10 in which the stator 11 and the rotor 21 are opposed to each other in the radial direction. Instead, the present invention may be applied to an axial-gap type motor in which the stator and the rotor are opposed to each other in the axial direction The above embodiment and the modified examples may be combined with one another.

The invention claimed is:

1. A motor comprising:
a stator including windings; and
a rotor rotated by a rotational magnetic field generated when drive currents are supplied to the windings, wherein
the rotor includes a rotor core, a first magnet pole, a second magnet pole, and a projection, wherein the first magnet pole, the second magnet pole, and the projection are arranged next to one another in a circumferential direction,
the first magnet pole uses a permanent magnet arranged in the rotor core,
the second magnet pole uses a permanent magnet arranged in the rotor core,
the second magnet pole has a different polarity from that of the first magnet pole, the projection projects from the rotor core in a radial direction, the windings include a first winding and a second winding, the first winding and the second winding are synchronously excited by the drive currents and connected in series, and the motor is configured so that the projection is opposed to the second winding at a rotational position of the rotor where the first magnet pole or the second magnet pole is opposed to the first winding.

2. The motor according to claim 1, wherein the projection is at least one of a plurality of projections, when n represents a total number of the first and second magnet poles, 2n number of reference lines are set to extend from a rotational axis of the rotor in the radial direction at equal angular intervals in the circumferential direction, each of the first and second magnet poles has a circumferential center arranged to be aligned with one of the reference lines, the plurality of projections are arranged between the first and second magnet poles in the circumferential direction, and at least one of the plurality of projections has a circumferential center arranged to be misaligned with the reference lines.

3. The motor according to claim 1, wherein when n represents a total number of the first and second magnet poles, 2n number of reference lines are set to extend from a rotational axis of the rotor in the radial direction at equal angular intervals in the circumferential direction, each of the first and second magnet poles has a circumferential center arranged to be aligned with one of the reference lines, the single projection is arranged between the first and second magnet poles in the circumferential direction, and the projection has a circumferential center arranged to be misaligned with a center line of the first and second magnet poles in the circumferential direction.

4. The motor according to claim 1, wherein the projection includes an opposing surface against the stator, each of the first and second magnet poles includes an opposing surface against the rotor, and an open angle of the opposing surface of the projection is set to differ from an open angle of the opposing surface of each of the first and second magnet poles.

5. The motor according to claim 1, wherein an outermost diameter of the projection is set to be greater than an outermost diameter of the first magnet pole and an outermost diameter of the second magnet pole.

6. The motor according to claim 1, wherein the first and second magnet poles respectively include the permanent magnets embedded into the rotor core.

7. The motor according to claim 6, wherein each of the first and second magnet poles includes two of the permanent magnets arranged in a generally V-shaped layout that widens outward in the radial direction in an axial view.

* * * * *